(12) United States Patent
Büttner et al.

(10) Patent No.: US 11,889,901 B2
(45) Date of Patent: Feb. 6, 2024

(54) CLOSURE DEVICE HAVING CLOSURE PARTS WHICH ARE ABLE TO BE PLACED AGAINST ONE ANOTHER

(71) Applicant: Fidlock GmbH, Hannover (DE)

(72) Inventors: Heiko Büttner, Hannover (DE); Lasse Hiller, Ronnenberg (DE); Breido Botkus, Hannover (DE); Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 250 days.

(21) Appl. No.: 17/277,336

(22) PCT Filed: Sep. 30, 2020

(86) PCT No.: PCT/EP2020/077328
§ 371 (c)(1),
(2) Date: Mar. 18, 2021

(87) PCT Pub. No.: WO2021/064002
PCT Pub. Date: Apr. 8, 2021

(65) Prior Publication Data
US 2022/0312904 A1 Oct. 6, 2022

(30) Foreign Application Priority Data
Oct. 2, 2019 (DE) .................... 10 2019 215 277.5

(51) Int. Cl.
*A44B 11/25* (2006.01)
*F16B 21/16* (2006.01)

(52) U.S. Cl.
CPC .......... *A44B 11/2588* (2013.01); *F16B 21/16* (2013.01); *F16B 2200/83* (2023.08)

(58) Field of Classification Search
CPC .... A44B 11/2588; F16B 21/16; F16B 21/165; F16B 2001/0035; F16B 2200/83
See application file for complete search history.

(56) References Cited

U.S. PATENT DOCUMENTS 6,000,306 A 12/1999 Erickson
6,131,247 A 10/2000 Morita
(Continued)

FOREIGN PATENT DOCUMENTS

DE 2656511 A1 6/1978
EP 0970628 A2 1/2000
(Continued)

*Primary Examiner* — Robert Sandy
*Assistant Examiner* — Louis A Mercado
(74) *Attorney, Agent, or Firm* — The Webb Law Firm

(57) ABSTRACT

A closure device includes a first closure part which has a body, and a second closure part. A locking element and an engagement portion in a closing position are mutually engaged in such a manner that the first closure part and the second closure part are locked to one another. The first closure part has a first magnetic installation, and the second closure part has a second magnetic installation, said first magnetic installation and said second magnetic installation when placing the first closure part and the second closure part against one another interact in a magnetically attractive manner. The at least one locking element is magnetically configured in such a manner that the at least one locking element in the closing position by way of the first magnetic installation and/or the second magnetic installation is loaded in the direction of engaging with the at least one engagement portion.

19 Claims, 30 Drawing Sheets

(56) References Cited

U.S. PATENT DOCUMENTS

| | | | |
|---|---|---|---|
| 6,182,336 B1 | 2/2001 | Bauer | |
| 6,295,702 B1 | 10/2001 | Bauer | |
| 8,009,002 B2* | 8/2011 | Fiedler | E05C 19/16 |
| | | | 335/306 |
| 8,353,544 B2* | 1/2013 | Fiedler | E05B 15/04 |
| | | | 292/318 |
| 8,368,494 B2* | 2/2013 | Fiedler | B62J 11/00 |
| | | | 269/8 |
| 8,430,434 B2* | 4/2013 | Fiedler | A44B 11/2592 |
| | | | 292/251.5 |
| 8,739,371 B2* | 6/2014 | Fiedler | A45C 13/1069 |
| | | | 24/303 |
| 8,851,534 B2* | 10/2014 | Fiedler | H01F 7/0263 |
| | | | 220/230 |
| 9,572,410 B2* | 2/2017 | Fiedler | E05B 37/12 |
| 10,703,429 B2* | 7/2020 | Fiedler | F16M 13/02 |
| 2020/0268108 A1 | 8/2020 | Fiedler | |
| 2021/0396044 A1* | 12/2021 | Fiedler | E05C 19/16 |

FOREIGN PATENT DOCUMENTS

| | | |
|---|---|---|
| EP | 1085959 A1 | 3/2001 |
| WO | 9964194 A1 | 12/1999 |
| WO | 2018073064 A1 | 4/2018 |
| WO | 2019096447 A1 | 5/2019 |

\* cited by examiner (A-A)

(A-A)

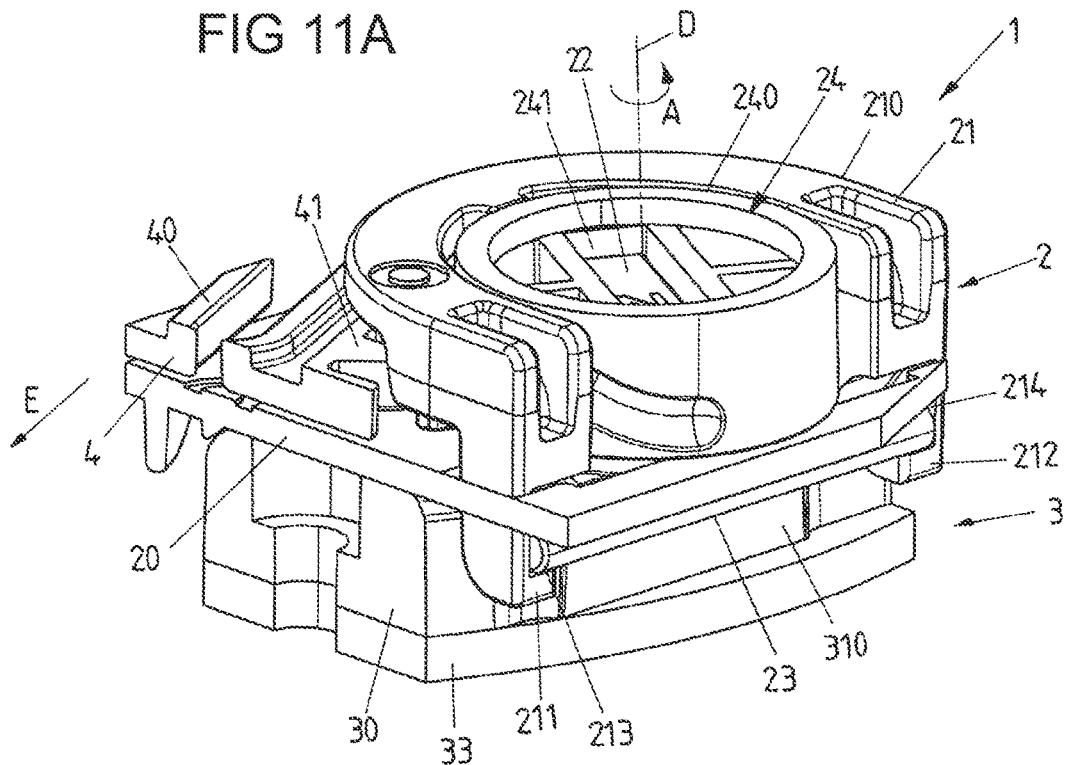
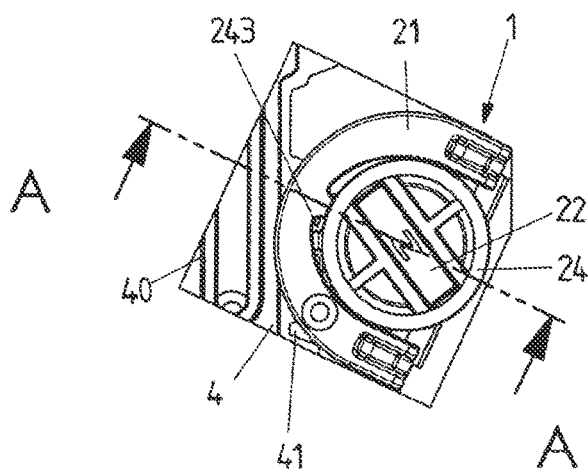
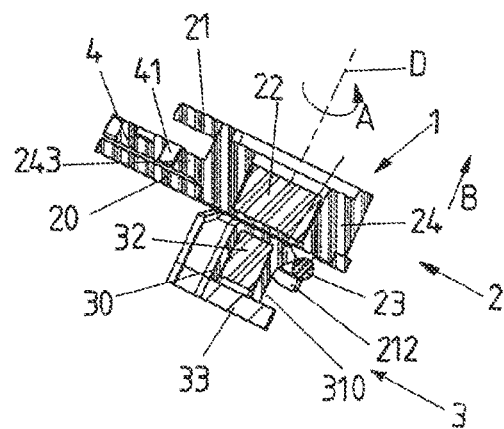

(A-A)

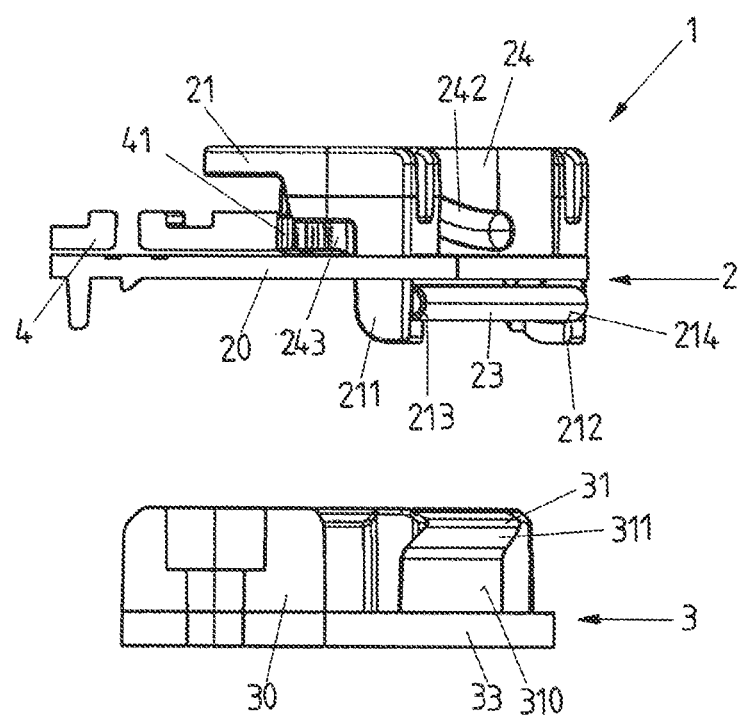
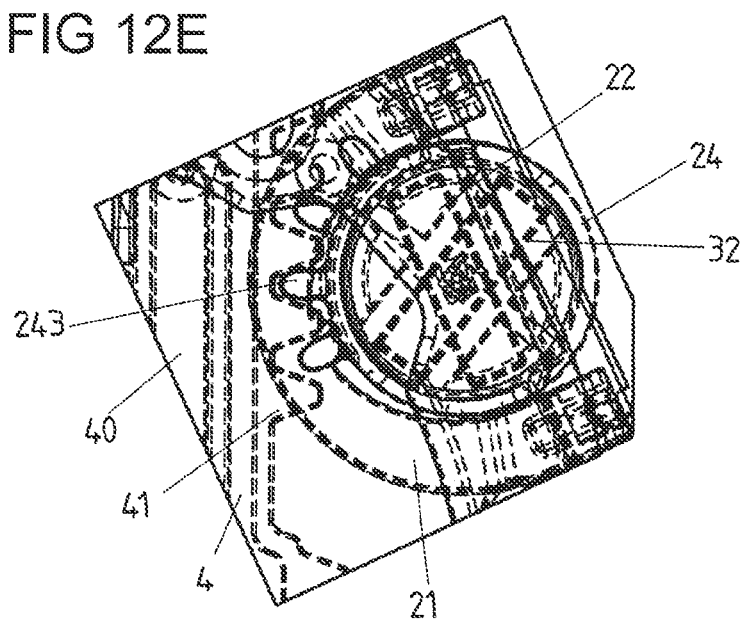

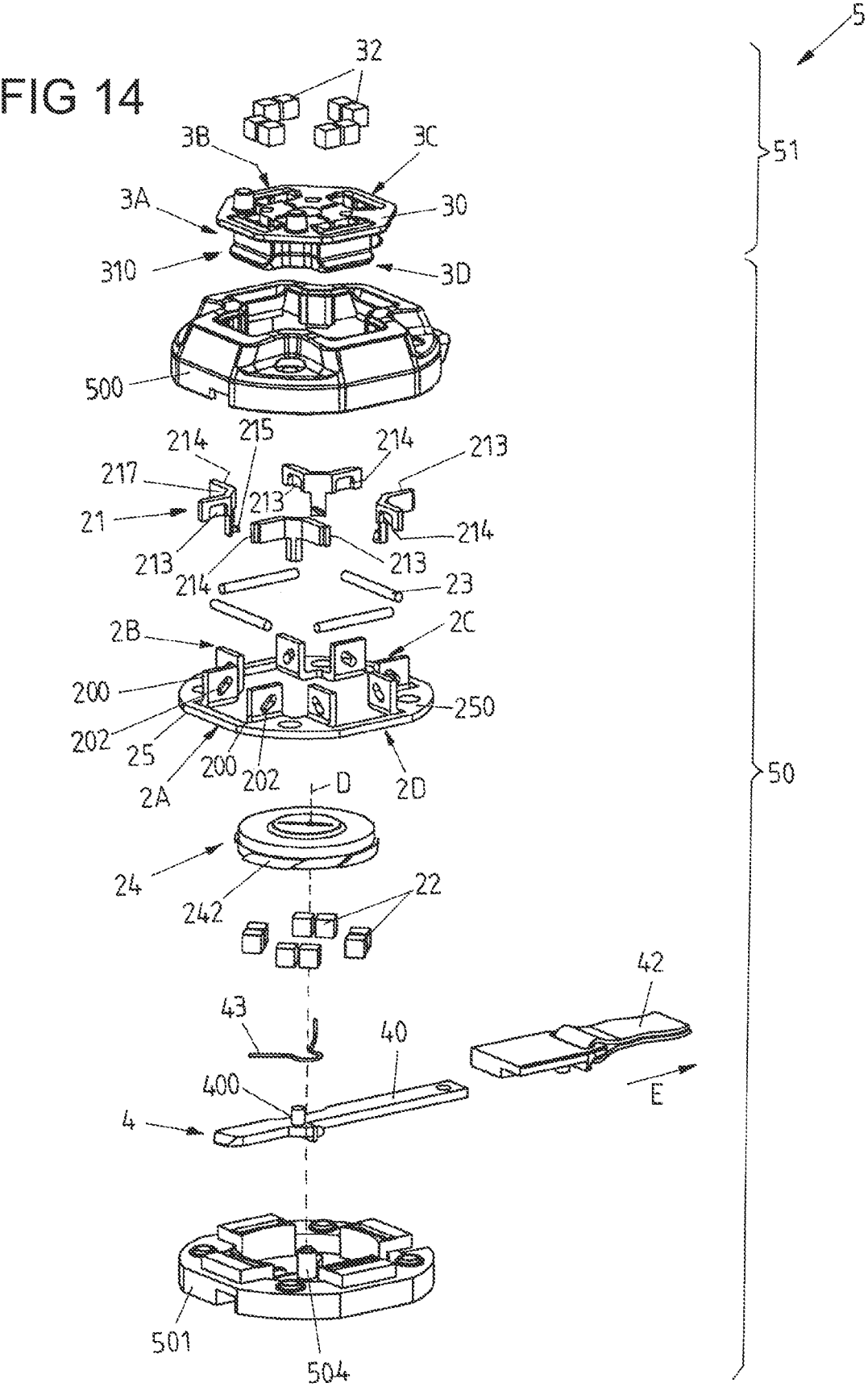

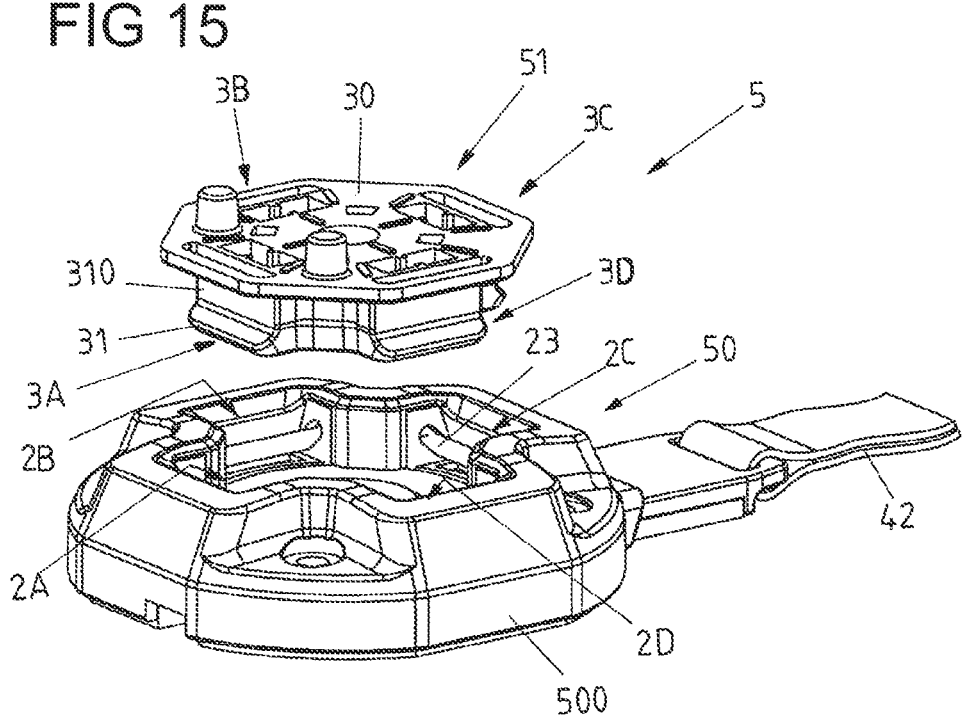
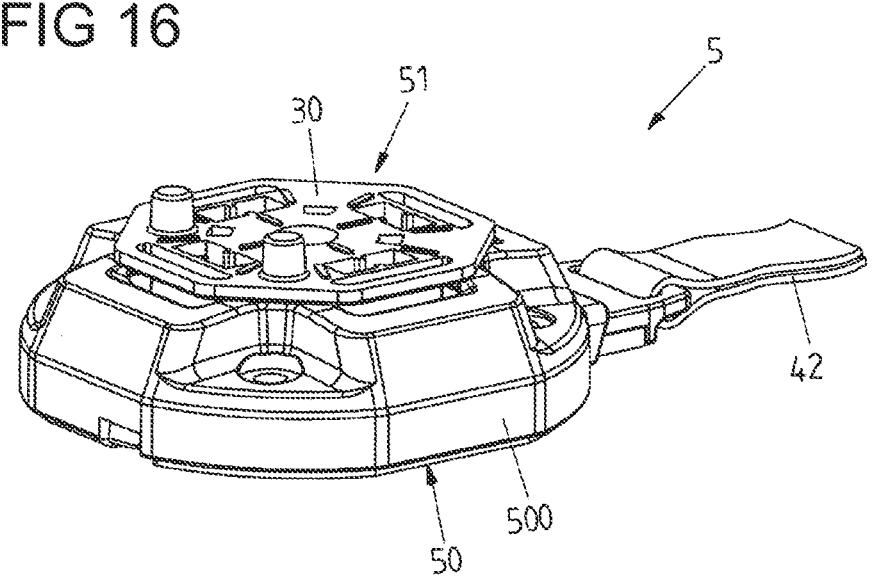

C-C

D-D

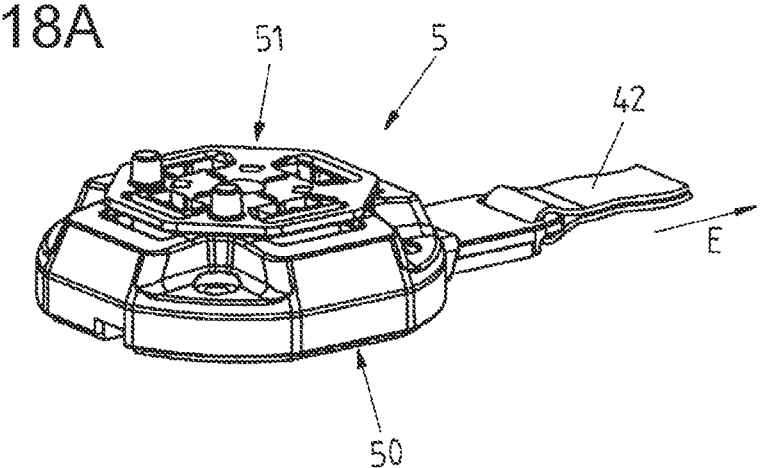
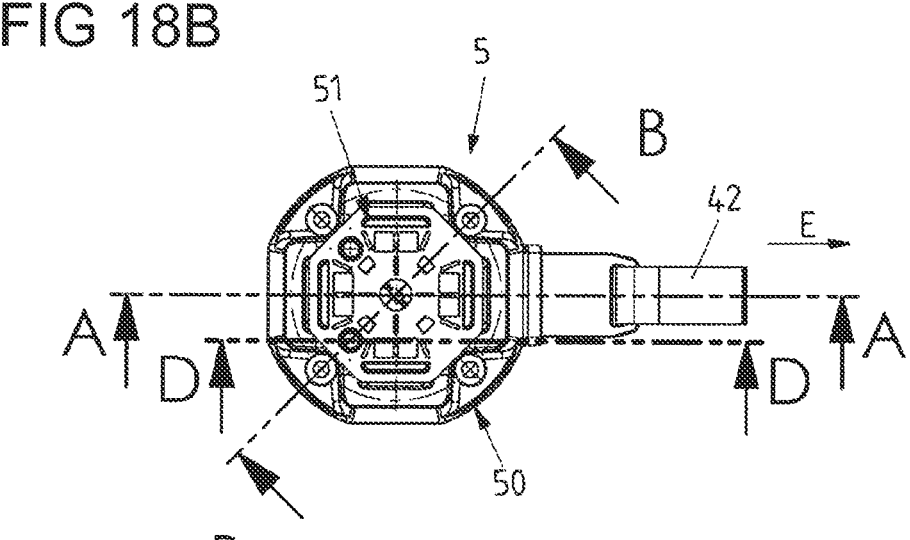
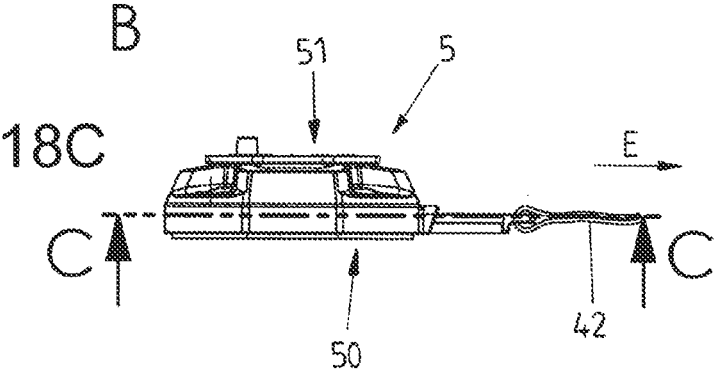

C-C

D-D

C-C

D-D

C-C

D-D

CLOSURE DEVICE HAVING CLOSURE PARTS WHICH ARE ABLE TO BE PLACED AGAINST ONE ANOTHER

CROSS-REFERENCE TO RELATED APPLICATIONS

This application is the United States national phase of International Application No. PCT/EP2020/077328 filed Sep. 30, 2020, and claims priority to German Patent Application No. 10 2019 215 277.5 filed Oct. 2, 2019, the disclosures of which are hereby incorporated by reference in their entirety.

BACKGROUND OF THE INVENTION

Field of the Invention

The disclosure relates to a closure device.

Description of Related Art

A closure device of this type comprises a first closure part which has a body, and a second closure part, said first closure part and said second closure part for closing the closure device being able to be placed against one another along a closing direction and in a closing position being connected to one another. The closure device furthermore has at least one locking element which is disposed so as to be adjustable on the body of the first closure part. At least one engagement portion is shaped on the second closure part. The at least one locking element and the at least one engagement portion in the closing position are mutually engaged in such a manner that the first closure part and the second closure part are locked to one another.

Such a closure device generally serves for connecting two assemblies to one another. Such a closure device can be used, for example, on an electronic apparatus, for example a mobile phone or a tablet computer, so as to (releasably) establish the electronic apparatus on a superordinate assembly, for example on a dashboard of a vehicle or the like. However, such a closure device can also be used on a bicycle, for example, for fastening an object, for example a drinks bottle, to a bicycle frame or a baggage rack. Such a closure device can also be used for establishing objects on a robotic gripper, for example.

Such a closure device in the closing position is to establish a fixed, load-bearing, mutual connection between the closure parts. The connection here in is to be releasable in a simple, comfortable manner so as to enable the user to separate the assigned assemblies from one another.

In a closure device known from U.S. Pat. No. 6,182,336 a so-called male part is to be placed against a so-called female part. A magnet which, while connecting in the manner of a plug, interacts with a disk-shaped locking element on the female part so as to lock the male part and the female part to one another in a closing position is disposed on the male part.

SUMMARY OF THE INVENTION

An object underlying the proposed solution is to provide a closure device which in a closing position establishes a fixed, load-bearing connection between the closure parts but at the same time is releasable in a simple and comfortable manner.

This object is achieved by a closure device having features as described herein.

Accordingly, the first closure part has a first magnetic installation, and the second closure part has a second magnetic installation. The first magnetic installation and the second magnetic installation, when placing the first closure part and the second closure part against one another, interact in a magnetically attractive manner. The at least one locking element herein is magnetically configured in such a manner that the at least one locking element in the closing position by way of the first magnetic installation and/or the second magnetic installation is loaded in the direction of engaging with the at least one engagement portion. The first closure part has an adjustment part and an operative element which is operatively connected to the adjustment part and is rotatable about a rotation axis, wherein the adjustment part by rotating the operative element is activatable in an activation direction so as to bring the at least one locking element to disengage from the at least one engagement portion in order for the first closure part and the second closure part to be released from one another.

The closure device is thus configured as a magnetic closure device. One magnetic installation is in each case disposed on the first closure part and on the second closure part, said magnetic installation being in each case configured by a permanent magnet, for example, or by a permanent magnet on one closure part and by a magnetic armature from a ferromagnetic material on the other closure part. The magnetic installations magnetically interact in such a manner that the closure parts when placing the closure parts against one another are pulled toward one another and to engage with one another, the closing of the closure device thus being magnetically facilitated.

The magnetic installations herein also serve for establishing the locking action between the first closure part and the second closure part in the closing position.

In addition to the first magnetic installation on the first closure part and to the second magnetic installation on the second closure part, the at least one locking element is thus magnetically configured, for example in that the at least one locking element is completely or partially made from a ferromagnetic material or is configured so as to be permanently magnetic such that the at least one locking element magnetically interacts with the first magnetic installation of the first closure part and/or the second magnetic installation of the second closure part.

The magnetic interaction herein is in particular of such a type that the at least one locking element in the closing position, by virtue of the magnetic interaction, is pulled so as to engage with the assigned engagement portion. The at least one locking element of the first closure part in the closing position thus engages in the assigned engagement portion on the second closure part such that a locking action on account thereof is established between the first closure part and the second closure part. The locking action is maintained by virtue of the magnetic interaction so that the closure parts are fixedly connected to one another in a load-bearing manner in the closing position.

For example, the at least one locking element of the first closure part in the closing position is magnetically attracted by the second magnetic installation of the second closure part and brought to engage with the engagement portion of the second closure part. The locking action is thus established in a self-acting manner by virtue of the magnetic interaction between the magnetic locking element and the second closure part when the closure device is closed so that the closure parts are fixedly held against one another in a load-bearing manner in the closing position.

The locking action can be cancelled, counter to the magnetic effect, by acting on the at least one locking element so that the closure parts can be separated from one another. On account of the at least one locking element being brought to disengage from the assigned engagement portion, the closure parts can thus be released from one another and the closure device be opened.

The adjustment of the locking element herein takes place by way of an adjustment part which is operatively connected to the locking element. The adjustment part is coupled to an operative element such that the adjustment part by activating the operative element can be activated in an activation direction relative to the body of the first closure part, so as to in this manner entrain the locking element and bring the latter to disengage from the assigned engagement portion in order for the first closure part and the second closure part to be released from one another.

The operative element herein is mounted so as to be rotatable in relation to the body of the first closure part, and to this end is mounted so as to be rotatable on the body, for example. The operative element is operatively connected to the adjustment part in such a manner that, when rotating the operative element about an assigned rotation axis, the adjustment part while deflecting force is activated in a preferably linear activation direction, the locking element on account thereof being entrained and being brought to disengage from the engagement portion.

This results in a simple, comfortable activation of the closure device in order for the closure parts to be released from one another. The adjustment of the operative element in haptic terms can take place in an appealing manner, wherein the operative element can also take place by way of an additional activation element to which the operative element is connected by way of a transmission, for example, so that the activation for releasing the closure device is further simplified.

In one embodiment, the first closure part or the second closure part has an engagement opening into which an engagement element, for example in the shape of a pin, of the respective other closure part can be introduced for closing the closure device. One of the closure parts is thus configured as a female part (having an engagement opening) while the other one of the closure parts is designed as a male part (having an engagement element). The at least one locking element can be disposed on the female part, and the at least one engagement opening can correspondingly be disposed on the male part. Conversely it is however also conceivable that the at least one locking element is disposed on the male part, while the at least one engagement portion is shaped on the female part.

In one embodiment the at least one locking element is adjustable in a linear manner in a plane which is spanned by the closing direction and a transverse direction which extends transversely to the closing direction (and transversely to a longitudinal direction along which the at least one locking element is elongate). Alternatively, the at least one locking element can also be pivotable in the plane which is spanned by the closing direction and the transverse direction. The at least one locking element is in each case adjustable on the first closure part so as to in a first position engage in the at least one engagement portion of the second closure part and to thus lock the closure parts to one another in the closing position. The at least one locking element is adjustable from this first position so as to cancel the locking action and to thus be able to release the closure parts from one another in a simple manner.

In one embodiment the rotation axis about which the operative element is to be rotated in relation to the body of the first closure part is directed along the closing direction.

The activation direction along which the adjustment part is movable for releasing the closure parts from one another can be directed along the rotation axis. When the operative element is rotated about the rotation axis, an adjustment of the adjustment part along the rotation axis thus takes place while deflecting force.

In one embodiment the operative element has a guiding installation on which the adjustment part is guided in such a manner that the adjustment part when rotating the operative element is activated in the activation direction. The guiding installation can in particular provide a deflection of force such that a rotating movement of the operative element is converted to an adjustment movement of the adjustment part which is preferably directed in a linear manner. The guiding installation can be achieved, for example, by a gate guide in which a guide element which in the form of a guide pin for example, is shaped on the adjustment part engages such that the adjustment part is moved along the activation direction when the operative element is being rotated. Alternatively, the guiding installation can also be shaped by an arrangement of one or a plurality of ramps onto which a guiding element which, shaped in the form of a guide pin, for example, on the adjustment part runs when the operative element is being rotated about the rotation axis of the latter.

The adjustment part can have, for example, two guiding elements on mutually opposite portions, said guiding elements engaging in each case in an assigned gate guide on the operative element so that the adjustment part is guided on two gate guides of the operative element.

The at least one locking element is preferably received in a receptacle opening on the body of the first closure part and adjustable in this receptacle opening. The receptacle opening can predefine a guide for the at least one locking element so as to define a linear adjustment movement or a pivoting movement of the at least one locking element on the body of the first closure part.

In one embodiment the receptacle opening in relation to the closing direction and to the transverse direction extends obliquely in such a manner that the at least one locking element is adjustable in the receptacle opening along an adjustment direction which extends so as to be oblique in relation to the closing direction and oblique in relation to the transverse direction. In this case, the at least one locking element is adjustable in a linear manner on the body of the first closure part. The adjustment direction herein extends so as to be oblique in relation to the closing direction such that the at least one locking element can be brought to engage with or disengage from the at least one engagement portion in a manner oblique in relation to the closing direction.

The oblique alignment of the receptacle opening can be of such a type that the at least one locking element can yield in a self-acting manner in the receptacle opening when the closure parts are being placed against one another. When the engagement element of the second closure part acts on the at least one locking element, the at least one locking element in the receptacle opening which is inclined so as to be oblique in relation to the closing direction can thus be displaced such that the engagement element can be moved along the at least one locking element and the at least one locking element can be brought to engage with the at least one engagement portion on the engagement element.

In one embodiment the at least one locking element is disposed on the adjustment part and is thus entrained when the adjustment part is moved such that the locking element by activating the adjustment part can be brought to disengage from the engagement portion in order for the connection between the closure parts to be released. The adjustment part can act on ends of the at least one locking element, for example, so as to bring the at least one locking element to disengage from the at least one engagement portion of the second closure part by adjusting the adjustment part. By adjusting the adjustment part the at least one locking element is thus moved such that the locking element is brought to disengage from the at least one engagement portion of the second closure part.

The at least one locking element on the adjustment part can be received in a bearing opening of the adjustment part, wherein the bearing opening is shaped in such a manner that the locking element in the bearing opening is movable transversely to the closing direction and thus is adjustable in relation to the adjustment part.

In one embodiment, the engagement portion has a first oblique face which extends obliquely to the closing direction, and the first closure part, for example in the region of the receptacle opening, has a second oblique face which extends obliquely to the closing direction. The at least one locking element in the closing position is disposed between the first oblique face and the second oblique face such that a locking action between the first closure part and the second closure part is hereby established.

The locking action between the first closure part and the second closure part acts in particular along the closing direction in such a manner that the first closure part and the second closure part are held against one another along the closing direction and are thus not readily releasable from one another along the closing direction, at least not without the locking action being released. When the closure parts are mutually loaded along the closing direction, forces are directed into the at least one locking element by way of the oblique faces, wherein the mutual angular position of the oblique faces determines the intensity and strength of the locking action.

In a first embodiment, the first oblique face and the second oblique face extend so as to be mutually parallel in a plane which is spanned by the closing direction and the transverse direction. This has the effect that the at least one locking element, when the closure parts are mutually loaded in the closing position, is jammed between planes which are directed so as to be mutually parallel, thus establishing a locking action between the closure parts. The closure parts when loaded can move relative to one another by way of a certain clearance. It is conceivable that the locking action is released in a self-acting manner and the closure parts can thus be separated from one another when a limit force is exceeded (for example when the engagement element under load tilts on account of a clearance between the engagement element and the engagement opening and the oblique faces are no longer aligned so as to be exactly mutually parallel).

In an alternative embodiment the angle between the oblique faces can be greater than zero. The oblique face in the plane spanned by the closing direction and the transverse direction thus describe a mutual angle which is greater than zero. This is to be understood that the available width between the oblique faces widens towards the outside, thus away from the engagement portion, the oblique faces thus describing a wedge shape which widens towards the outside. Such an angular mutual disposal of the oblique faces has the effect that the closure parts in the closing position can be held in an at least approximately clearance-free manner. Should vibrations forces act between the closure parts, for example, this has the effect that the at least one locking element is drawn to engage more deeply in the at least one engagement portion such that the closure parts are compressed so as to mutually engage in a clearance-free manner. The closure parts herein, while cancelling the locking action in a self-acting manner, can be released from one another in a self-acting manner when a certain limit force is exceeded.

In yet another alternative embodiment the angle between the oblique faces is less than zero. The oblique faces in the plane spanned by the closing direction and the transverse direction thus describe a mutual angle that the available width between the oblique faces decreases towards the outside, thus away from the at least one engagement portion. The oblique faces thus mutually describe a wedge shape which tapers towards the outside. An angular mutual disposal of the oblique faces of this type has the effect that the connection between the closure parts is self-securing in the closing position. The at least one locking element in the presence of a load between the closure parts is wedged between the oblique faces in such a manner that the at least one locking element is loaded so as to be engaged more deeply with the at least one engagement portion, the connection between the at least one locking element and the engagement portion thus being stabilized. A certain clearance can arise between the closure parts when loaded.

In one embodiment the at least one locking element is configured as an elongate bar element. The at least one locking element in the closing position engages with the assigned engagement portion. In order for the closure parts to be mutually released, the at least one locking element in the assigned receptacle opening on the body of the first closure part can be moved obliquely to the closing direction, for example, so as to bring the at least one locking element to disengage from the assigned engagement portion.

Alternatively, the at least one locking element can be configured so as to be annular, for example, wherein the at least one locking element in this case circumferentially extends about the closing direction and herein is configured so as to be circumferentially closed or so as to be circumferentially open at one location (thus configured as an opened ring). The at least one locking element in the closing position engages with an engagement portion which on an engagement element of the second closure part is shaped so as to encircle the closing direction, for example. In order for the connection between the closure parts to be released, the at least one locking element can be adjusted, for example in that the radius of the annular locking element is expanded and the locking element is thus brought to disengage from the assigned engagement portion of the second closure part. The locking element in this case is thus advantageously at least in portions configured so as to be elastic.

In one embodiment the first magnetic installation of the first closure part is disposed on the operative element and is rotatable conjointly with the operative element. This can in particular result in that the magnetic pulling forces between the first closure part and the second closure part can also be influenced, in particular weakened, by rotating the operative element such that not only the locking action is released by activating the operative element, but that the magnetic adhesion between the closure parts is also weakened and optionally even reversed so as to be repulsive. This can further facilitate the closure parts in being released from one another.

The first closure part can have only one locking element, for example. In one embodiment, however, the first closure part has two (or more) locking elements. When two locking elements are provided on the first closure part, the locking elements are disposed on both sides of an engagement opening which be shaped on the first closure part, for example, and can thus interact on both sides with the engagement element of the second closure part and the engagement portions shaped thereon so as to establish a locking action on both sides in the closing position.

In one embodiment the second closure part is designed as a rigid element having a base unit and a rigid engagement element in the manner of a pin for engaging in an assigned engagement opening of the first closure part, said rigid engagement element being integrally shaped on the base unit. In one embodiment the second magnetic installation of the second closure part can be disposed on the engagement element such that the first closure part and the second closure part interact in a magnetically pulling manner and are drawn so as to mutually engage in a self-acting manner when the engagement element is brought to engage with the engagement opening. One or a plurality of engagement portions herein can be shaped on the engagement element of the second closure part so that one or a plurality of locking elements of the first closure part are engaged so as to lock to the second closure part in the closing position of the closure device.

A closure assembly can have a plurality of closure devices of the type described above, for example. The closure assembly can have a first fastening unit and a second fastening unit, for example, wherein the first fastening unit has a plurality of first closure parts of the plurality of closure devices, and the second fastening unit has a plurality of second closure parts of the plurality of closure devices. The fastening units can be placed against one another and in a connected position are fixedly connected to one another in mechanical terms by way of the closure devices, wherein the placing of the fastening units against one another is magnetically facilitated by the magnetic installations of the closure devices.

The closure devices of the closure assembly can have in each case one dedicated operative element, for example. However, it is also conceivable that the closure devices have a common operative element which is rotatable about a common rotation axis so that no separate operative elements are present on the closure devices but the operative elements of the closure devices are integrally configured by a common single-piece element.

The closure devices can be opened, and the fastening units can thus be released from one another, by activating the dedicated operative elements or the common operative element of the closure devices, so that the fastening units can be separated and removed from one another.

In one embodiment the first fastening unit has an activation element which is designed as a slide, for example, and is mounted so as to be displaceable in a linear manner on a housing part of the first fastening unit, for example. The activation element by way of a transmission connection is connected to the operative element of each first closure part of the closure devices in such a manner that the operative element is adjustable by activating the activation element. Should the closure devices have dedicated operative elements, the activation element is coupled to the operative elements in such a manner that the operative elements are conjointly adjustable by adjusting the activation element. Should the closure devices have a common operative element for adjusting the adjustment part of the closure devices, the common operative element can be rotated by activating the activation element. The activation element thus enables a conjoint activation for opening the individual closure devices such that the closure devices are unlocked and the fastening units can thus be released from one another by activating the activation element.

In order for the transmission connection to be configured, the activation element can have a toothed portion, for example, which by way of teeth engage with an assigned toothing of the operative element such that the toothed portions of the activation element mesh with the toothing on the operative element and the operative element of each closure device is thus rotated when the activation element is adjusted. The adjustment parts are activated by rotating the dedicated operative elements or the common operative element, on account of which the locking elements of the individual closure devices are adjusted and the locking action is thus released.

Instead of an engagement by teeth, a transmission connection can also be achieved by way of another transmission, for example a lever mechanism, a friction transmission which has friction elements, or a rope mechanism, or the like.

The transmission connection can also be established by way of a coupling element which, for example in the form of a coupling pin, is shaped on the activation element and engages in a coupling opening on the operative element. A longitudinal adjustment movement of the activation element can be converted to a rotating movement of the operative element by way of such a coupling such that the operative element can be rotated by activating the activation element. Dedicated operative elements of the closure devices, or a common operative element of all of the closure devices, can in this way be rotated by way of the activation element.

Activating a plurality of closure devices by way of a common activation element and coupling the activation element to operative elements by way of a transmission connection can also be used in a closure assembly in which the operative elements of the individual closure devices are not adjustable in a rotatable but in a linear manner, for example.

For example, a connector assembly has a plurality of closure devices which comprise in each case: a first closure part which has a body, and a second closure part, said first closure part and said second closure part for closing the closure device being able to be placed against one another along a closing direction and in a closing position be connected to one another; and at least one locking element which is adjustable in relation to the body of the first closure part; and at least one engagement portion which is shaped on the second closure part. The at least one locking element and the at least one engagement portion in a closing position are mutually engaged in such a manner that the first closure part and the second closure part are locked to one another. It is provided herein that the first closure part of each closure device has a first magnetic installation, and the second closure part of each closure device has a second magnetic installation, wherein the first magnetic installation and the second magnetic installation when placing the first closure part and the second closure part against one another interact in a magnetically attractive manner, and the at least one locking element is magnetically configured in such a manner that the at least one locking element in the closing position by way of the first magnetic installation and/or the second magnetic installation is loaded in the direction of engaging with the at least one engagement portion. The first closure part of each closure device has an adjustment part and an operative element which is operatively connected to the adjustment part, wherein the adjustment part by adjusting the operative element is activatable in an activation direction so as to bring the at least one locking element to disengage from the at least one engagement portion in order for the first closure part and the second closure part to be released from one another, wherein the closure assembly has an activation element which by way of a transmission connection is connected to the operative elements of the first closure parts of the plurality of closure devices in such a manner that the operative elements are conjointly adjustable by activating the activation element.

A closure assembly of this type can be combined with the aspects and advantageous embodiments of the individual closure devices as discussed above, such that reference to this extent is made fully to the preceding explanations.

The operative elements in the closure assembly can be configured by dedicated operative elements so that each closure device is assigned its own operative element. However, the operative elements can also be configured by a common, integral element which is rotatable about a common rotation axis.

The adjustment parts can be configured as rockers, for example, which are activated by way of oblique deflection faces.

BRIEF DESCRIPTION OF THE DRAWINGS

The concept on which the solution is based is to be explained in more detail hereunder by means of the exemplary embodiments illustrated in the figures.

FIG. 11A shows a view of an individual closure device of the closure assembly when being further opened;

FIG. 11B shows a plan view of the assembly according to FIG. 11A;

FIG. 11C shows a sectional view along the line A-A according to FIG. 11B;

FIG. 12D shows a lateral view of the assembly according to FIG. 12A;

FIG. 12E shows a partially transparent plan view of the assembly according to FIG. 12A;

FIG. 14 shows an exploded view of a further exemplary embodiment of a closure assembly;

FIG. 15 shows a view of the closure assembly in an opened position;

FIG. 16 shows a view of the closure assembly in a closing position;

FIG. 18A shows a view of the closure assembly when opening;

FIG. 18B shows a plan view of the closure assembly;

FIG. 18C shows a lateral view of the closure assembly;

DESCRIPTION OF THE INVENTION

Figure 1:
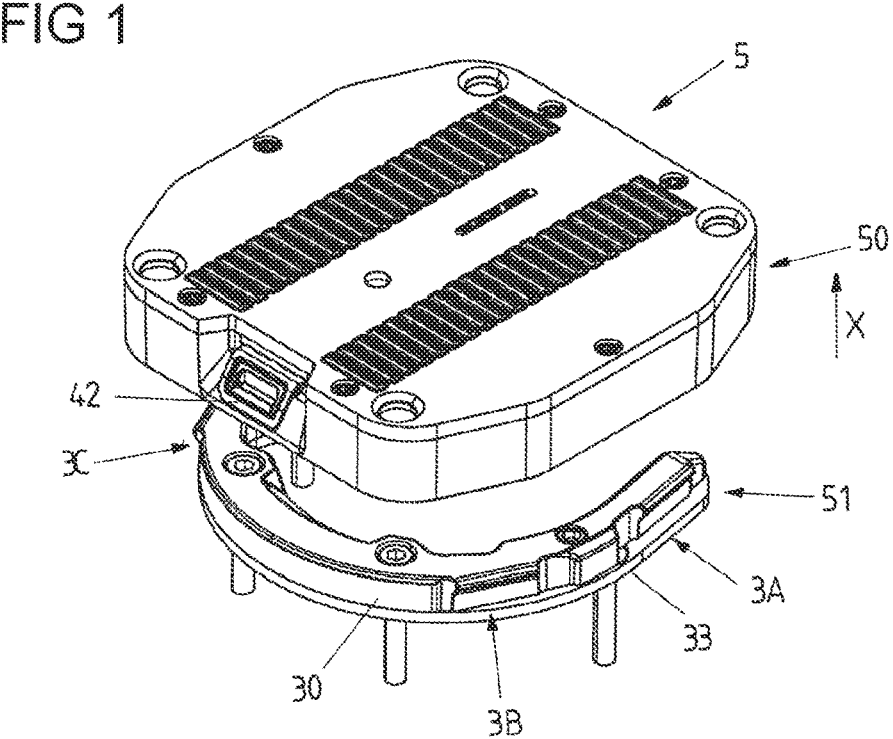
FIG. 1 shows a view of an exemplary embodiment of a closure assembly having a first fastening unit and a second fastening unit in a position in which the fastening units are separated from one another.

FIGS. 1 to 13 show an exemplary embodiment of a closure assembly 5 which has fastening units 50, 51 which can be placed against one another along a closing direction X, as can be seen from FIG. 1, and in a closing position are fixedly connected to one another.

The closure assembly 5 can be used, for example, for fastening a bag to a superordinate assembly, for example to a vehicle, for example to a motorcycle. An assembly to be fastened, for example a bag, herein can be connected to the fastening unit 50, while the fastening unit 51 is established on the superordinate assembly, for example the vehicle, such that the assembly to be fastened by way of the closure assembly 5 can be releasably established on the superordinate assembly.

Figure 2:
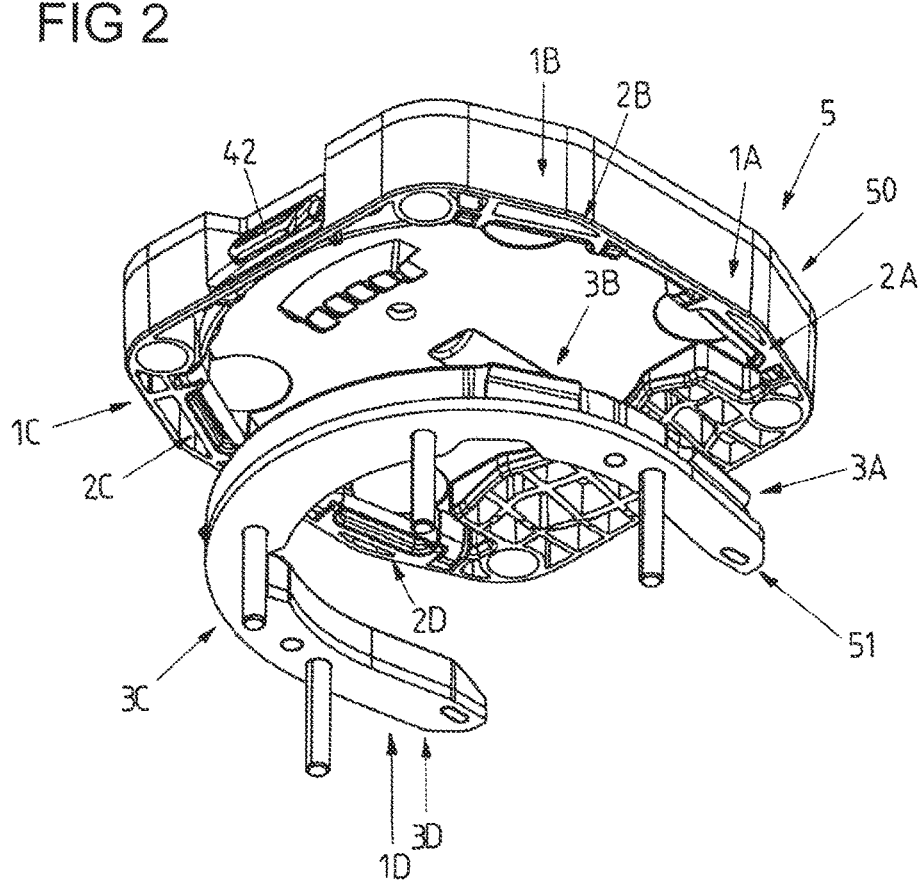
FIG. 2 shows another view of the closure assembly.
Figure 3:
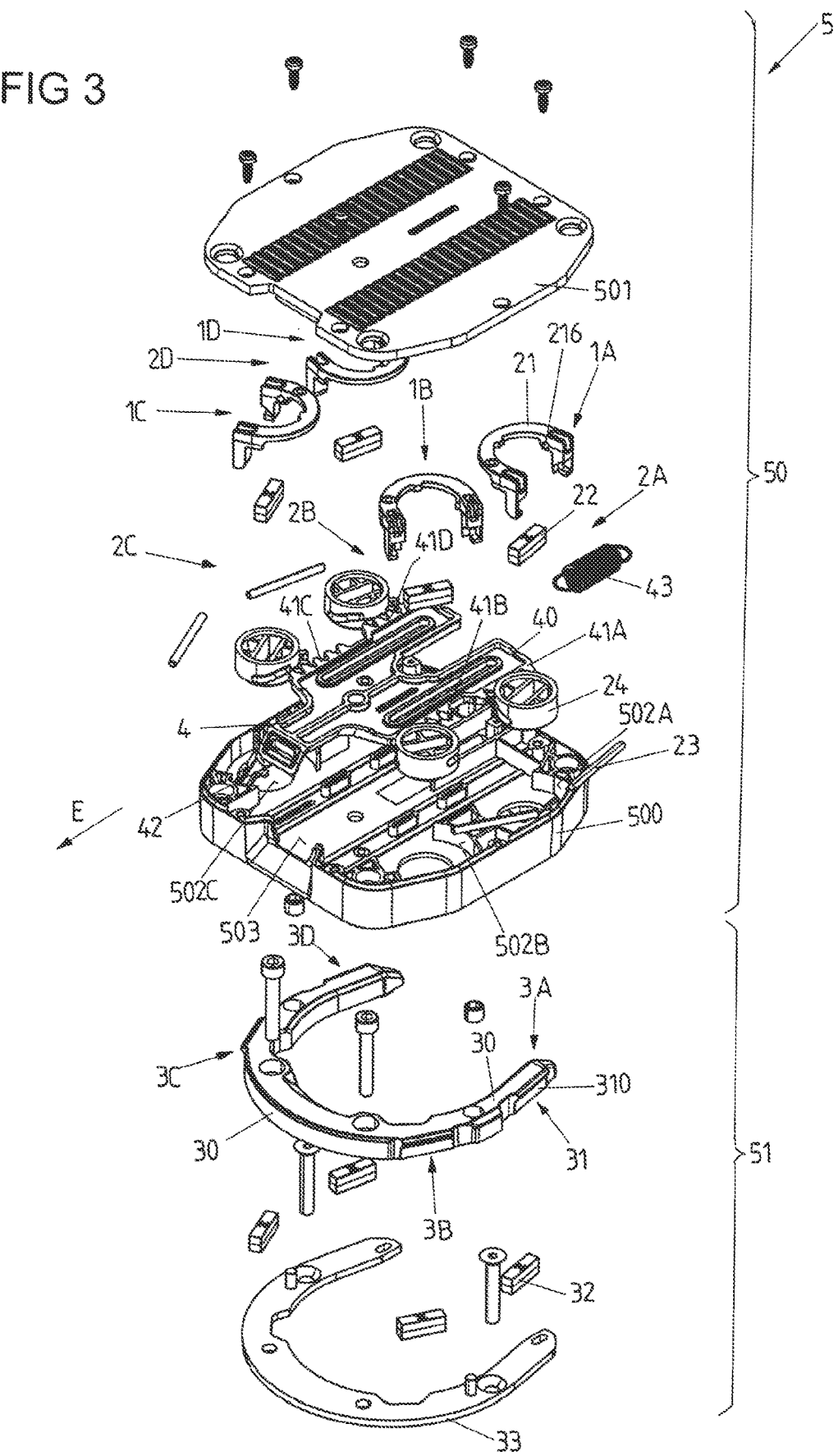
FIG. 3 shows an exploded view of the closure assembly.

As can be seen from FIGS. 1 and 2 in combination with the exploded view according to FIG. 3, the fastening unit 50 has a housing part 500 which is closed by way of a cover 501.

An activation element 4 is mounted in the housing part 500 so as to be displaceable along an unlocking direction E, wherein a handle 42 projects from the housing part 500, as can be seen from FIGS. 1 and 2, and is accessible from the outside so that the activation element 4 can be manually activated from the outside by a user, for example.

The closure assembly 5 has a plurality of closure devices 1A-1D which comprise in each case a first closure part 2A-2D and a second closure part 3A-3D and serve for fixedly locking the fastening units 50, 51 to one another in the closing position so that the fastening units 50, 51 are held against one another in a load-bearing manner.

Figure 6:
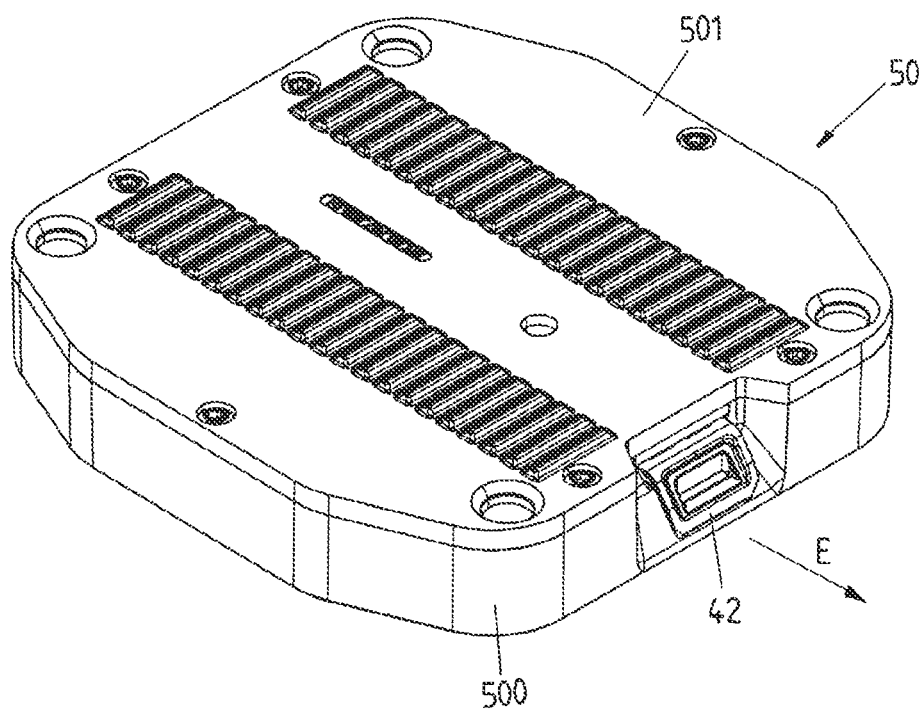
FIG. 6 shows a dedicated view of the first fastening unit.
Figure 7:
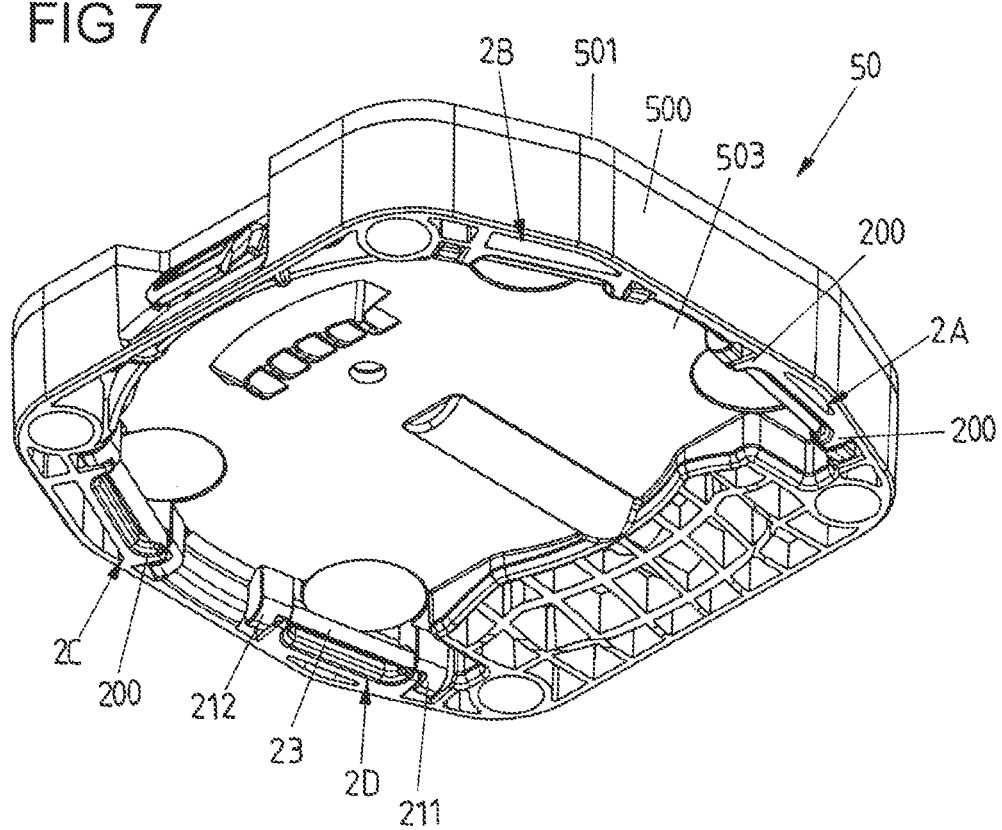
FIG. 7 shows another view of the first fastening unit.

The first closure parts 2A-2D, the functions thereof are still to be explained in detail hereunder, are disposed on the fastening unit 50 and, as can be seen from the exploded view according to FIG. 3 in combination with FIGS. 6 and 7, have in each case one locking element 23, one adjustment part 21, and one operative element 24 which is rotatably received in a respective assigned bearing receptacle 502A-502D of the housing part 500.

Figure 8:
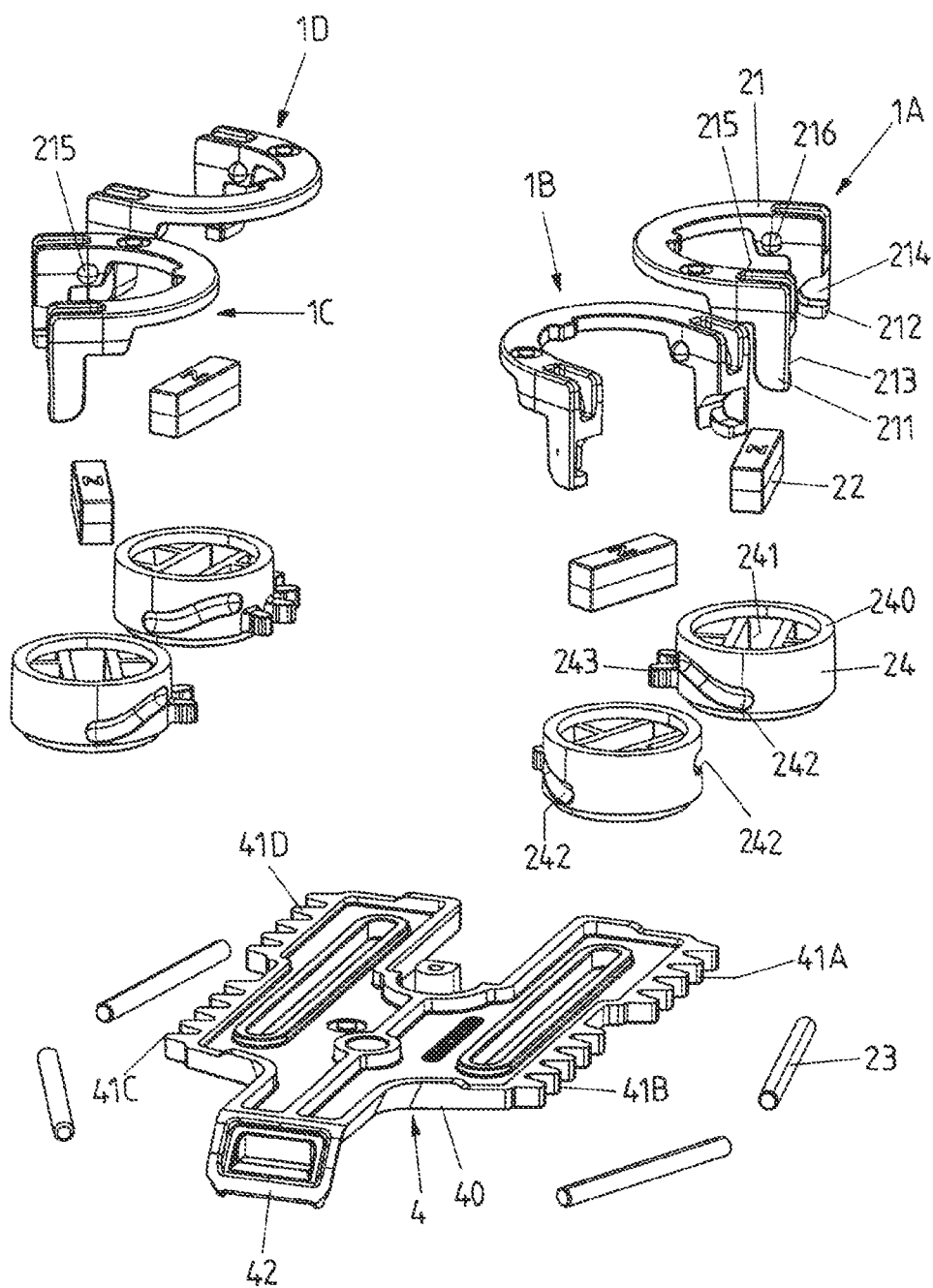
FIG. 8 shows a view of closure parts of the first fastening unit.

A toothing 243 by way of which each operative element 24 by way of teeth engages with an assigned toothed portion 41A-41D on an adjustment body 40 of the activation element 4 such that the operative elements 24 can be conjointly rotated by activating the activation element 4, is shaped on a rotary body 240 of each operative element 24, as can be seen from FIG. 8 for example.

The activation element 4 by way of a spring element 43 is biased in a sprung manner in relation to the housing part 500 such that an activation of the activation element 4 in the unlocking direction E takes place counter to the spring bias of the spring element 43, which is configured as a tension spring, and the activation element 4 upon activation by virtue of the spring bias is reset in a self-acting manner to a non-activated initial position.

Figure 4:
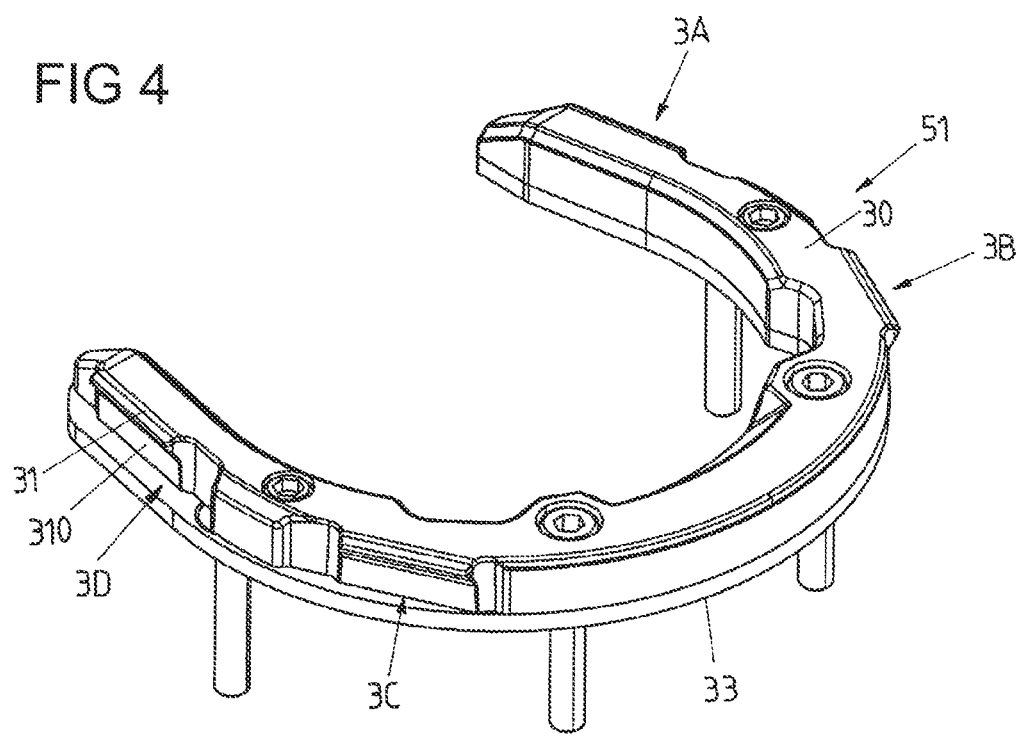
FIG. 4 shows a dedicated view of the second fastening unit.
Figure 5:
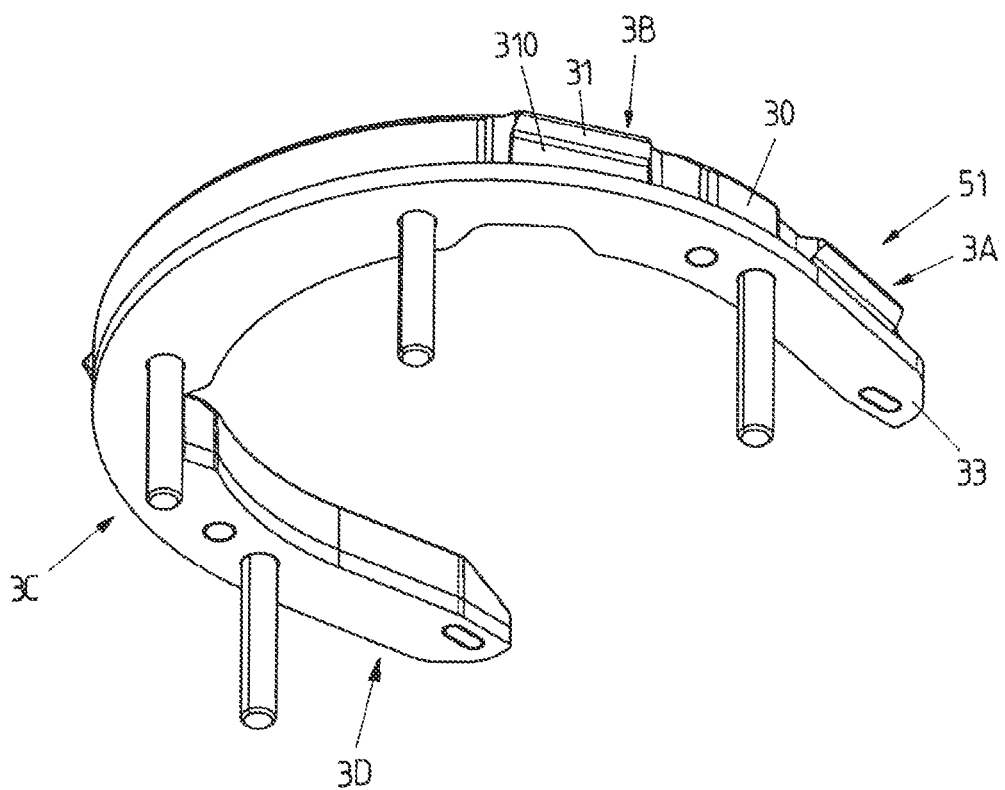
FIG. 5 shows another view of the second fastening unit.

In contrast, the second closure parts 3A-3D are shaped on a horseshoe-shaped base unit 30, as can be seen from FIGS. 4 and 5 for example, and have in each case one engagement element 31 having an engagement portion 310 which is shaped on said engagement element 31 and serves for interacting with the locking elements 23 of the first closure parts 2A-2D of the fastening unit 50. The base unit 30 is to be established on a superordinate unit, for example a vehicle, for example a tank of a motorcycle, by way of a fastening plate 33 and suitable fastening elements, for example in the form of screws.

The functional mode of each closure device 1A-1D is to be described hereunder by means of FIGS. 9A-9E to FIGS. 12A-12E, wherein an individual closure device 1 is illustrated in various positions in FIGS. 9A-9E to FIGS. 12A-12E and, so as to represent the closure devices 1A-1D according to FIGS. 1-8, is uniformly referred to by the reference sign 1.

The closure device 1 as is illustrated in FIGS. 9A-9E to FIGS. 12A-12E has a locking element 23 in the form of a bar-shaped element which is disposed on bearing arms 211, 212 on a body element 210 of the adjustment part 21 and by way of mutually opposite ends is received in bearing openings 213, 214 on the bearing arms 211, 212. The adjustment part 21 is mounted on a body 20 of the closure part 2 so as to be adjustable along an activation direction B which is opposite to the closing direction X, said body 20 being formed by a base 503 of the housing part 500 (cf. the exploded view according to FIG. 3). To this end, the adjustment part 21 by way of the bearing arms 211, 212 protrudes through the body 20 and on a side of the body 20 that faces away from the operative element 24 is coupled to the locking element 23.

The operative element 24 has a rotary body 240 which in relation to the body 20 is rotatable about a rotation axis D. The operative element 24, by way of guiding installations 242 in the form of gate guides which are shaped so as to be diametrically opposite one another on an external circumferential casing face of the rotary body 240 (cf. to this end FIG. 8, for example) are coupled with guiding elements 215, 216 in the form of guide pins on the inside of the body element 210 of the adjustment part 21 in such a manner that a rotating movement of the operative element 24 in a rotation direction A about the rotation axis D is converted to a linear adjustment movement of the adjustment part 21 in the activation direction B in relation to the body 20 and thus to the base 503 of the housing part 500.

To this end, the gate guides 242 extend obliquely to the closing direction X, wherein the guide elements 215, 216 in a rotating movement of the operative element 24 slide in the gate guides 242, the adjustment part 21 on account thereof being moved along the activation direction B.

Figure 9A:
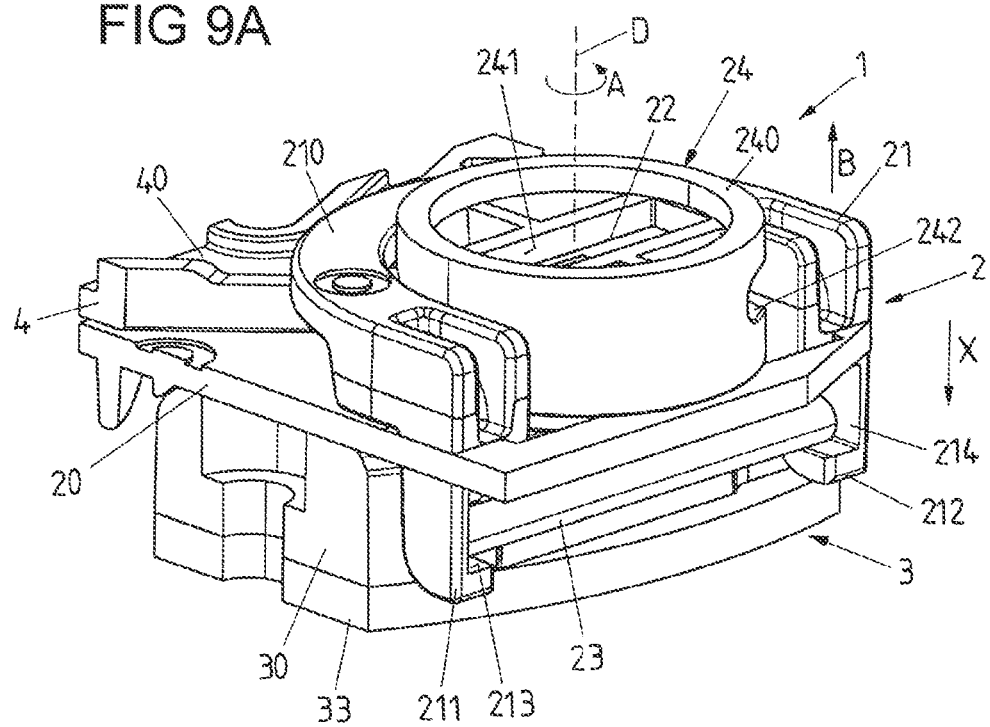
FIG. 9A shows a view of an individual closure device of the closure assembly in a closing position.
Figure 9B:
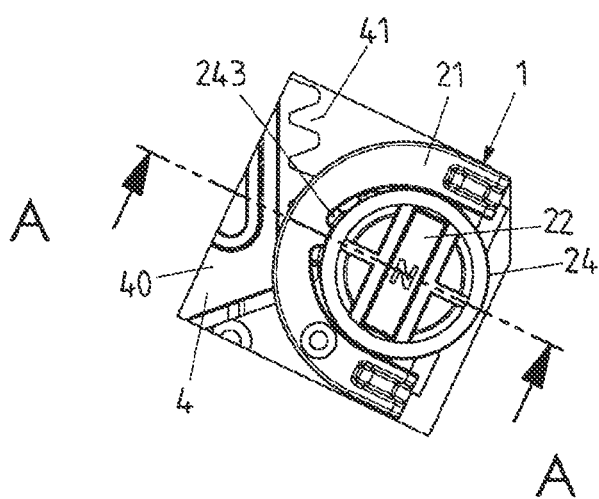
FIG. 9B shows a plan view of the assembly according to FIG. 9A.
Figure 9C:
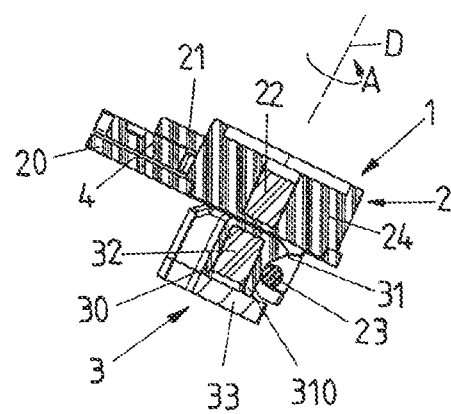
FIG. 9C shows a sectional view along the line A-A according to FIG. 9B.
Figure 9D:
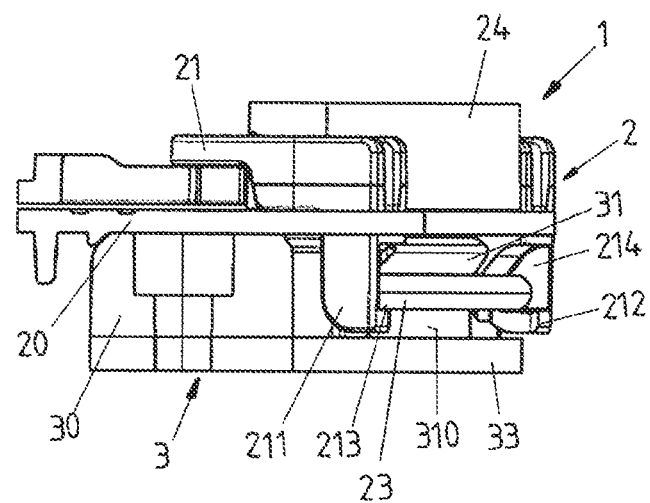
FIG. 9D shows a lateral view of the assembly according to FIG. 9A.
Figure 9E:
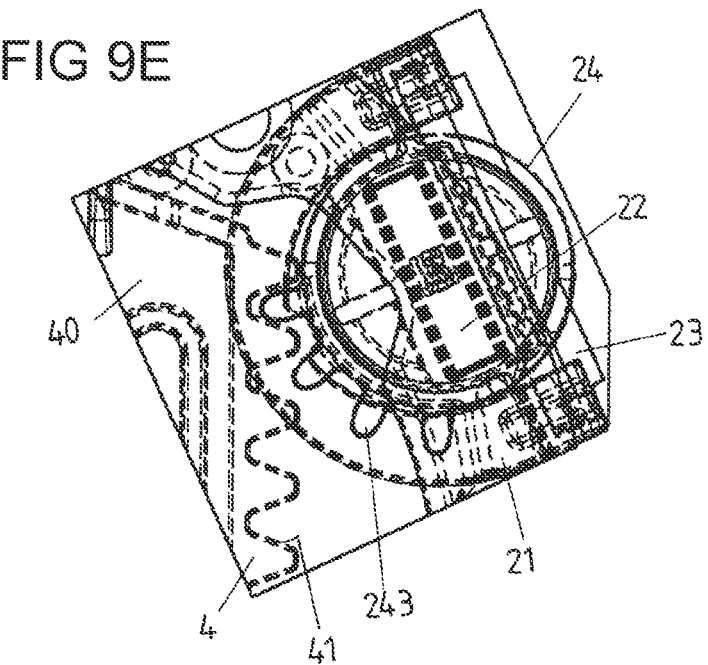
FIG. 9E shows a partially transparent plan view of the assembly according to FIG. 9A.
Figure 10A:
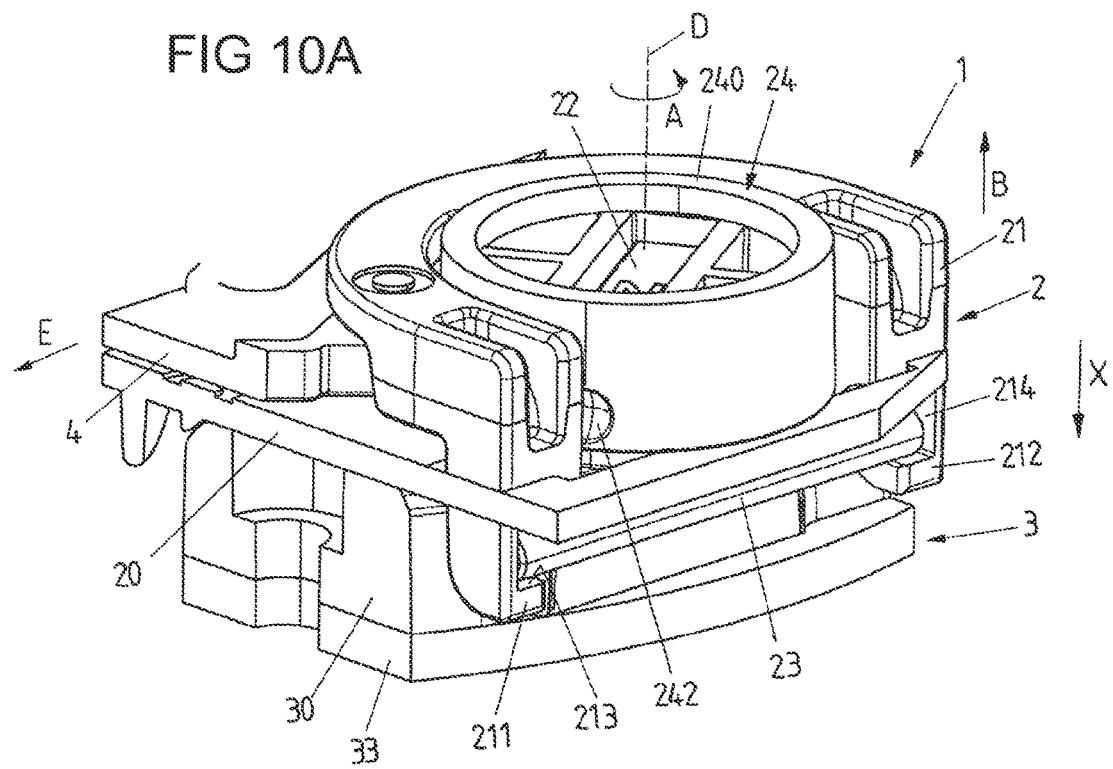
FIG. 10A shows a view of an individual closure device of the closure assembly when opening by activating an operative element.
Figure 10B:
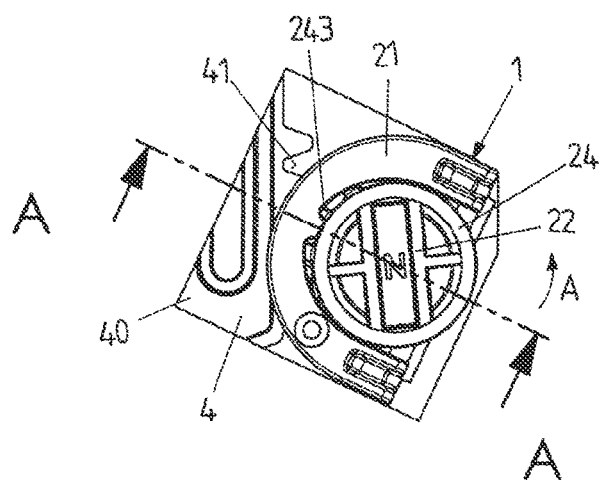
FIG. 10B shows a plan view of the assembly according to FIG. 10A.
Figure 10C:
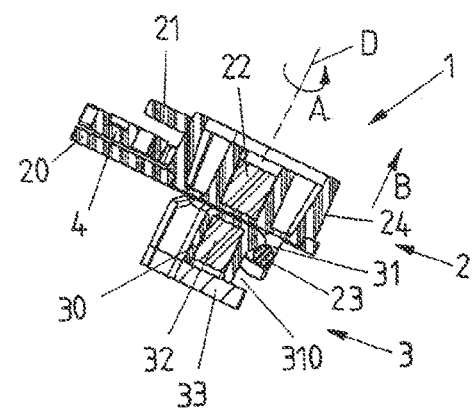
FIG. 10C shows a sectional view along the line A-A according to FIG. 10B.
Figure 10D:
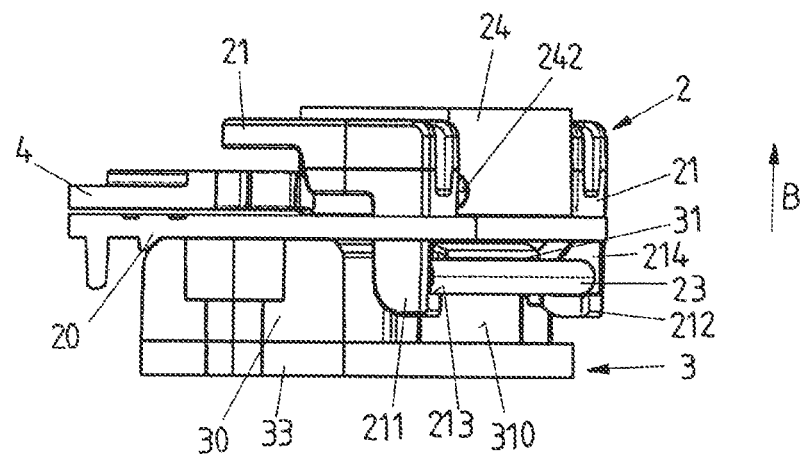
FIG. 10D shows a lateral view of the assembly according to FIG. 10A.
Figure 10E:
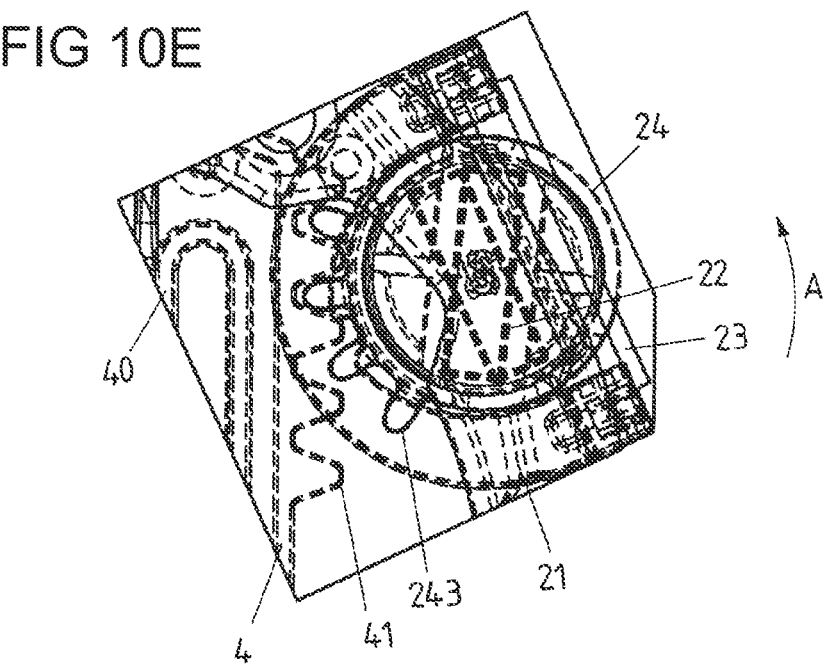
FIG. 10E shows a partially transparent plan view of the assembly according to FIG. 10A.
Figure 13:
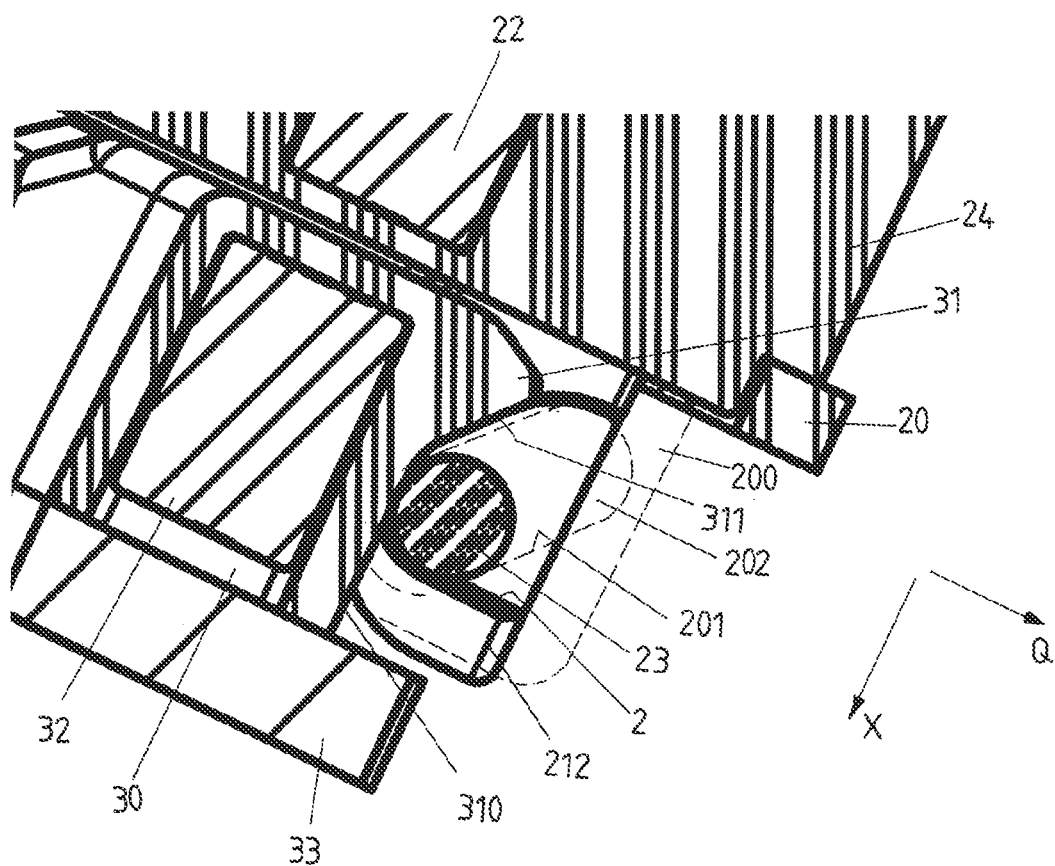
FIG. 13 shows an enlarged fragment of the sectional view according to FIG. 9C illustrating the locking action in the closing position.

FIGS. 9A-9E show the closure device 1 in the closing position in which the locking element 23 of the closure part 2 on the fastening unit 50 is engaged in a locking manner with an engagement element 31 of the closure part 3 on the fastening unit 51, as can be seen, for example, from the sectional view according to FIG. 9C in combination with the enlarged illustration according to FIG. 13.

In addition to being coupled to the adjustment part 21, the locking element 23 is received in a receptacle opening 202 on a support element 200 which is shaped on the body 20 and projects from the base 503 of the fastening unit 50 in the closing direction X, as this can be seen from FIG. 7 in combination with FIG. 13. The receptacle opening 202 is shaped in the manner of a slot and herein in a plane spanned by the closing direction X and a transverse direction Q extends obliquely to the closing direction X in such a manner that the bar-shaped locking element 23 is movable in the assigned receptacle opening 202, said locking element 23 extending perpendicularly to the plane spanned by the closing direction X and the transverse direction Q.

In order for the closure direction 1 to be closed, the closure parts 2, 3 along the closing direction X are placed against one another in such a manner that each engagement element 31 on the fastening unit 51 comes to engage with the respective assigned locking element 23 on the fastening unit 50. The engagement element 31 when being placed against the locking element 23 urges the latter towards the outside and thus sideways in the receptacle openings 202 such that the closure parts 2, 3 reach the closing position illustrated in FIGS. 9A-9E.

Each closure part 2, 3 herein has a magnetic installation, said magnetic installations when placing the closure parts 2, 3 against one another being mutually opposite in a magnetically attractive manner such that the placing of the fastening units 50, 51 against one another for closing the closure assembly 5 is magnetically facilitated. The magnetic installations 22, 32 can in each case be configured by a permanent magnet, for example, wherein the magnetic installations 22, 32 of the individual closure parts 2, 3 face one another by way of non-identical poles and thus interact in a magnetically attractive manner. It is also conceivable for one of the magnetic installations 22, 32 to be configured by a permanent magnet, and the other magnetic installation 32, 22 to be configured by a magnetic armature from a ferromagnetic material.

The magnetic installation 22 of the closure part 2 in the exemplary embodiment illustrated is received in an assembly opening 241 within the rotary body 240 of the operative element 24 such that the magnetic installation, conjointly with the operative element 24, is rotatable about the rotation axis D when the operative element 24 is being rotated.

In contrast, the magnetic installation 32 of the closure part 3 is received within the base unit 30.

The magnetic installation 32 of the second closure part 3 interacts in a magnetically attractive manner with the locking element 23. This has the effect that the locking element 23 in the closing position is drawn so as to engage with the engagement portion 310 on the engagement element 31 such that a locking action by way of a positive lock is established between the closure parts 2, 3, as can be seen from FIGS. 9A-9E.

When the closure parts 2, 3 are loaded in relation to one another, the locking element 23 is wedged between an oblique face 311 on the engagement portion 310 and an opposite oblique face 201 within the receptacle opening 202 on the support element 200, as can be seen from FIG. 13. The closure parts 2, 3 are thus held against one another in a locking manner and cannot be readily released from one another, at least not without the locking action being released (wherein a separation of the closure parts 2, 3 when exceeding a predetermined limit force is optionally possible).

If the closure parts 2, 3 are to be released from one another, the operative element 24 can be rotated in the rotation direction A about the rotation axis D in that the activation element 4 in relation to the housing part 500 of the fastening unit 50 is moved in the unlocking direction E. The operative elements 24 of all of the closure devices 1A-1D of the closure assembly 5 herein are conjointly activated, this being caused by the transmission connection between the activation element 4 and the individual operative elements 24.

The adjustment part 21 of each closure device 1 is adjusted in the activation direction B by rotating the operative element 24 in the rotation direction A, as can be seen from FIGS. 10A-10D and 11A-11D. The locking element 23 is entrained on account thereof, wherein the locking element 23 runs onto the oblique face 311 on the engagement portion 310 of the engagement element 31, on account thereof is adjusted in the transverse direction Q towards the outside, and is thus moved past the engagement element 31.

Figure 11D:
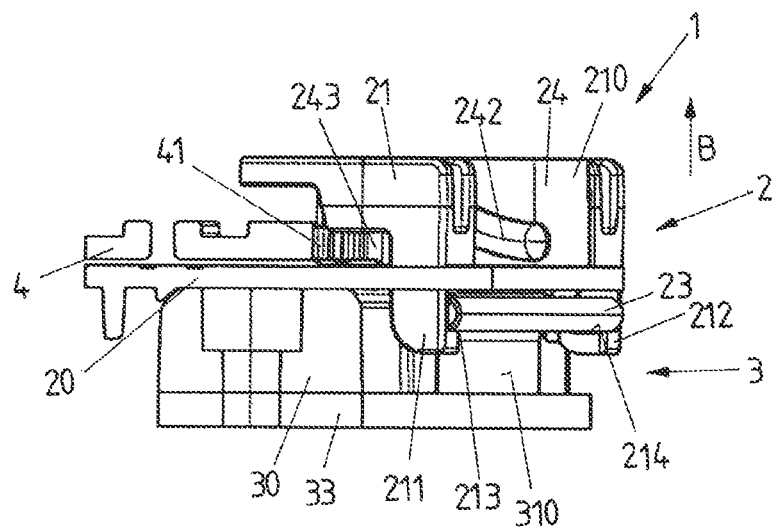
FIG. 11D shows a lateral view of the assembly according to FIG. 11A.
Figure 11E:
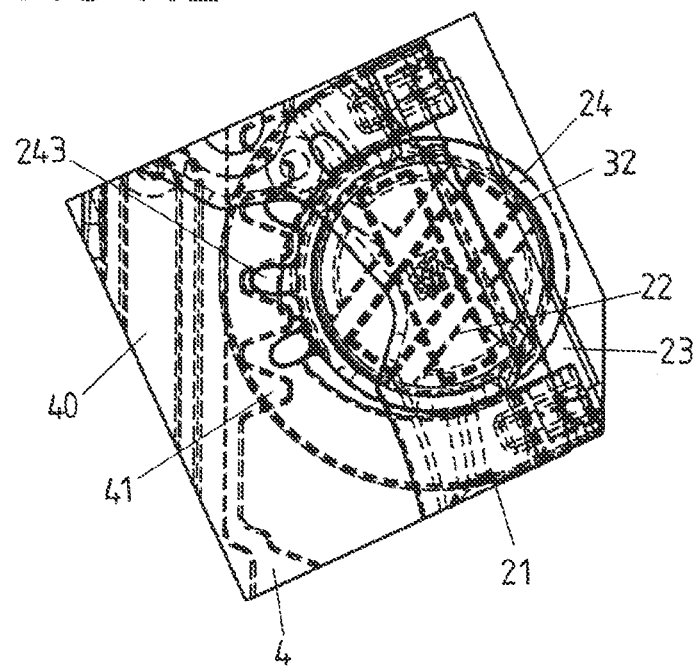
FIG. 11E shows a partially transparent plan view of the assembly according to FIG. 11A.
Figure 12A:
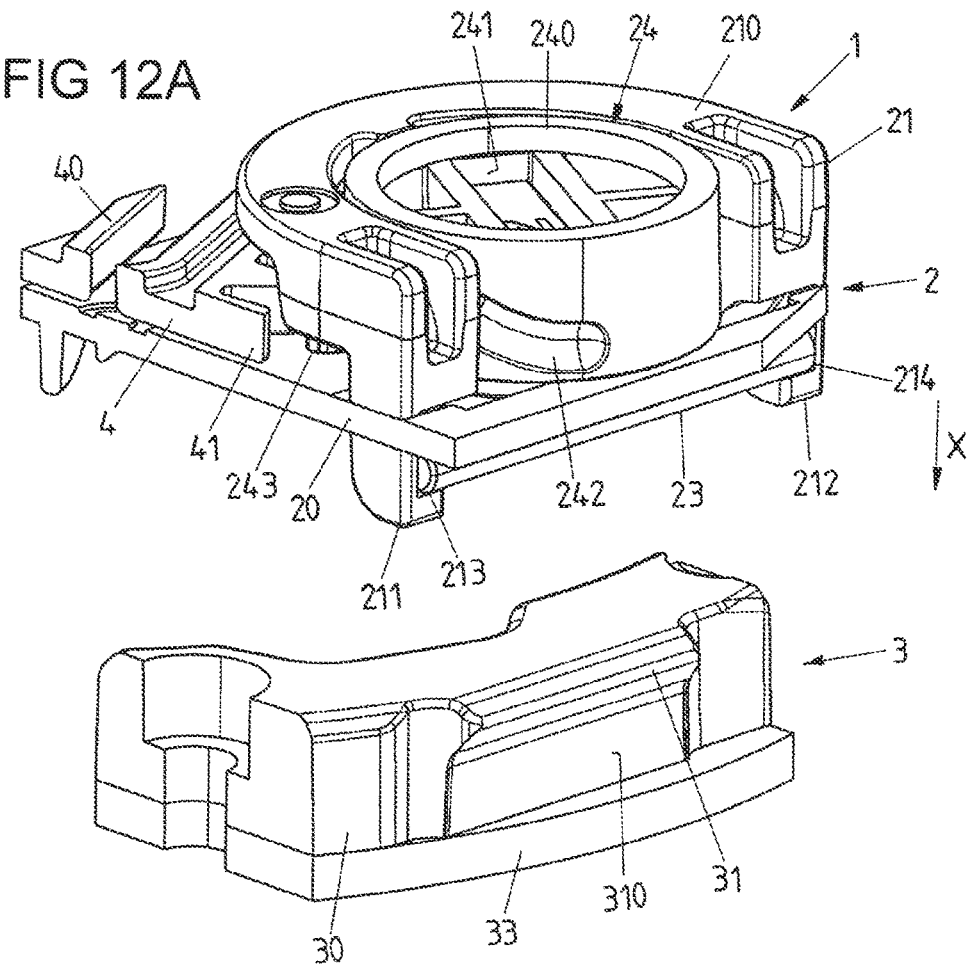
FIG. 12A shows a view of an individual closure device of the closure assembly in an opened position.
Figure 12B:
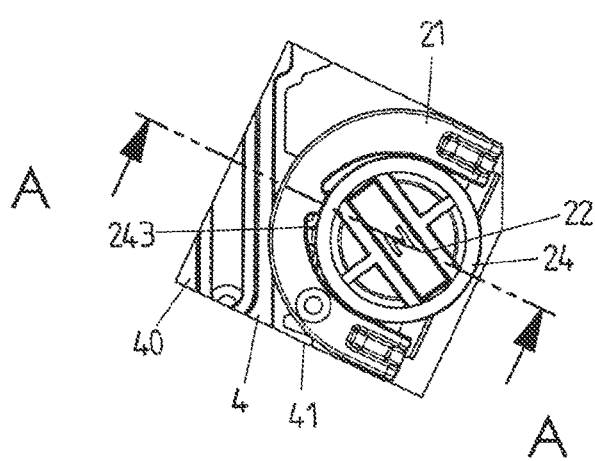
FIG. 12B shows a plan view of the assembly according to FIG. 12A.
Figure 12C:
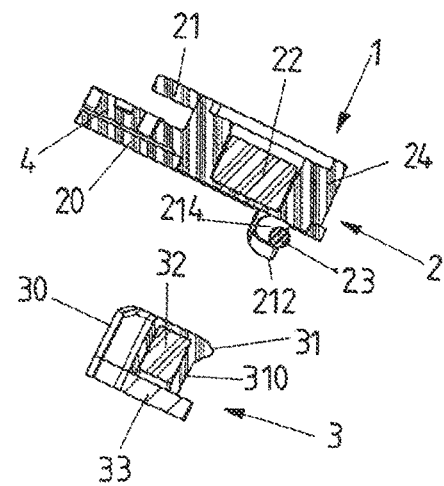
FIG. 12C shows a sectional view along the line A-A according to FIG. 12B.

Because the magnetic installation 22 of the closure part 2 is conjointly rotated when the operative element 24 is being rotated, the magnetic attraction between the magnetic installations 22, 32 weakens, as can be seen from the superimposed transparent view according to FIG. 11 for example, since the magnetic installations 22, 32 are moved out of congruence.

The closure parts 2, 3 can thus be released from one another counter to the closing direction X in a simple manner, as is illustrated in FIGS. 12A-12E. The force required for opening in this embodiment is predefined by the magnetic force which acts between the magnetic installation 22 and the magnetic installation 32. The adjustment part 21 is thus magnetically biased and cannot be inadvertently opened easily by minor release forces.

The force which is required for displacing the adjustment part 21 herein increases under load.

A fixed, load-bearing multipoint connection in the closing position results on account of the fastening units 50, 51 of the closure assembly 5 being connected to one another by way of a plurality of closure devices 1A-1D.

The opening of the closure device 1 is simple and comfortable. For opening, a user can in particular simply grip the activation element 4 by the handle 42 and pull said activation element 4 in the unlocking direction E. The closure devices 1A-1D can be conjointly opened on account thereof such that the fastening units 50, 51 can be released from one another counter to the closing direction X.

A further exemplary embodiment of a closure assembly 5 is illustrated in FIGS. 14 to 22A-22C.

In this exemplary embodiment a closure assembly 5 has fastening units 50, 51 which can be placed against one another so as to establish a connection between the fastening units 50, 51 and thus between assemblies which are connected by the fastening unit 50, 51.

In the exemplary embodiment illustrated a first fastening unit 50 has a housing which is formed by housing parts 500, 501 and encases a locking assembly 25. The locking assembly 25 herein configures closure devices 2A-2D which have in each case one locking element 23 which is disposed on assigned support elements 200 which in the form of lugs protrude from a disk-shaped body 250 and is guided in receptacle openings 202 in the form of slots on the support elements 200.

Adjustment parts 21 of the closure devices 2A-2D in the exemplary embodiment illustrated are configured by an assembly of sliding elements 217 which are guided on the housing part 500 of the housing and have bearing openings 213, 214 for acting on ends of the locking elements 23.

An operative element 24 is mounted on the housing part 501 so as to be rotatable about a rotation axis D, said operative element 24 being collectively assigned to the closure devices 2A-2D and configuring guiding installations 242 for interacting with the sliding elements 217. The operative element 24 is mounted on a bearing element 504 of the housing part 501 and can be rotated in order for the sliding elements 217 to be conjointly adjusted and on account thereof to act on the locking elements 23.

An activation element 4 has an adjustment body 40 in the form of an elongate bar which is coupled to a handle 42 which a user can grip for activating the activation element 40. The activation element 4 is guided so as to be displaceable along an unlocking direction E between the housing parts 500, 501 and by way of a coupling element 400 in the form of a coupling pin is coupled to the operative element 24 in such a manner that the operative element 24 can be rotated about the rotation axis D by longitudinally displacing the activation element 4, so as to in this manner adjust the sliding elements 217.

A second fastening unit 51 is formed by a body 30 on which closure parts 3A-3D having in each case one engagement element 31 in the form of an engagement portion 310 which is delimited by a protrusion are shaped. Each closure part 2A-2D of the fastening unit 50 herein is assigned one closure part 3A, 3D of the fastening unit 51.

Magnetic elements 22 in the form of an assembly of permanent magnets are disposed on the operative element 24. The magnetic elements 22 are assigned to the fastening unit 50. Magnetic elements 32 in the form of an assembly of permanent magnets are disposed on the body 30 of the fastening unit 51. The placing of the fastening units 50, 51 against one another for establishing a locked connection between the closure parts 2A-2D, 3A-3D in a magnetically facilitated manner takes place by an interaction of the magnetic elements 22, 32.

FIG. 15 shows the closure assembly 5 in an opened position. In contrast, FIG. 16 shows the closure assembly 5 in a closing position. The fastening units 50, 51 in the closed position are connected to one another and thus locked to one another such that the fastening units 50, 51, and thus assemblies which are connected to the fastening unit 50, 51, are held against one another in a fixed and load-bearing manner.

FIGS. 17A to 17G show views of the closure assembly 5 in the closing position. The locking elements 23 in the closing position in the assigned receptacle openings 202 of the support elements 200 of the locking assembly 25 are situated in a position which is close to the fastening unit 51. The locking elements 23 by virtue of the oblique extent of the receptacle openings 202 are offset in a radially inward manner and engage with the engagement elements 31 of the fastening units 51, as can be seen from FIG. 17D. Locking action between the fastening units 50, 51 is thus established by way of the closure parts 2A-2D, 3A-3D.

Figure 17A:
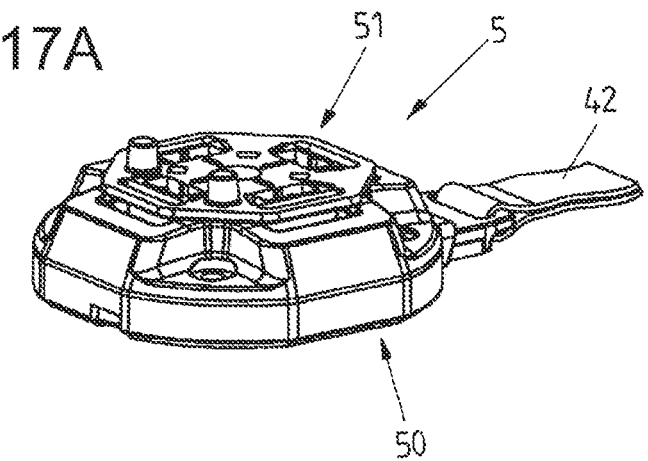
FIG. 17A shows a view of the closure assembly in the closing position.
Figure 17B:
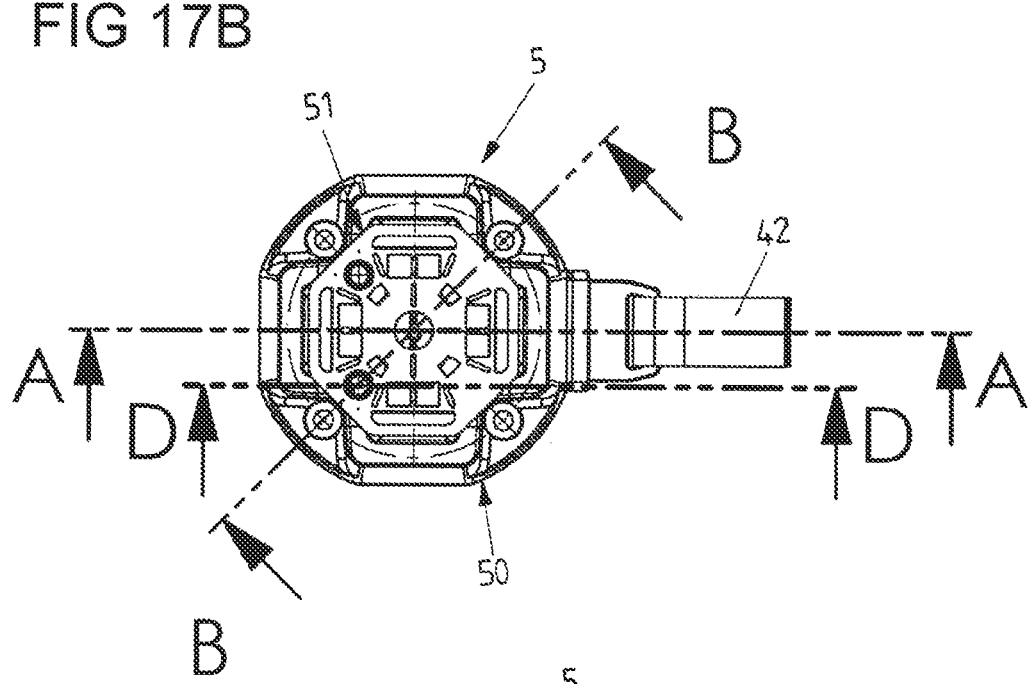
FIG. 17B shows a plan view of the closure assembly.
Figure 17C:
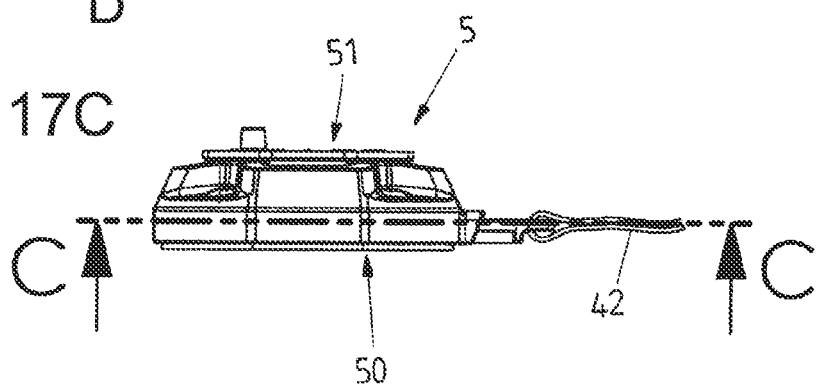
FIG. 17C shows a lateral view of the closure assembly.
Figure 17D:
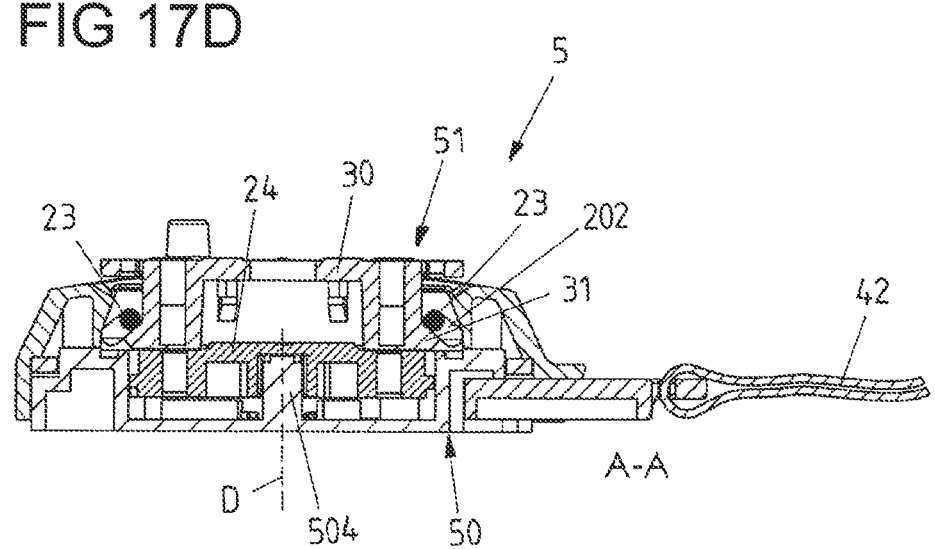
FIG. 17D shows a sectional view along the line A-A according to FIG. 17B.

The locking elements 23 are magnetic and by way of a magnetic interaction with the magnetic elements 32 of the fastening unit 51 are drawn in a self-acting manner so as to engage with the engagement elements 31, as can be seen from FIG. 17D.

Figure 17E:
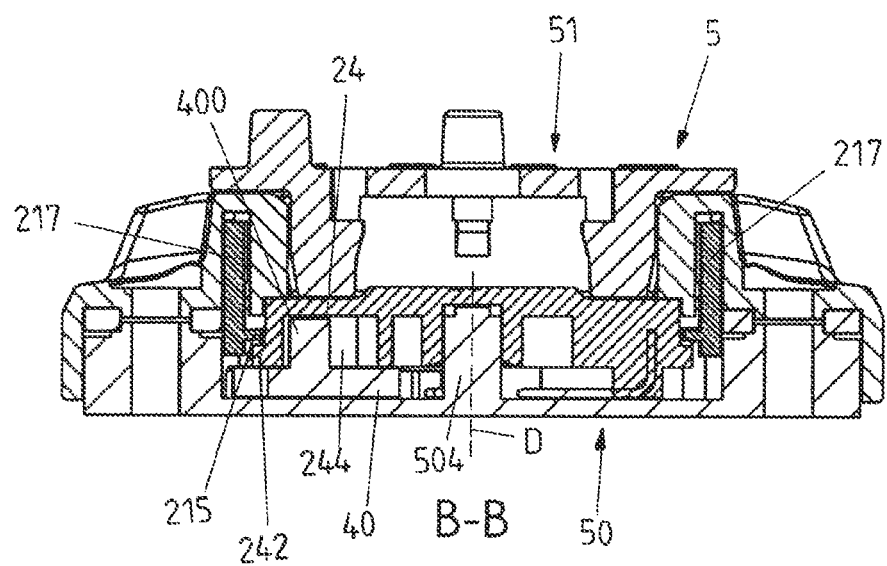
FIG. 17E shows a sectional view along the line B-B according to FIG. 17B.
Figure 17F:
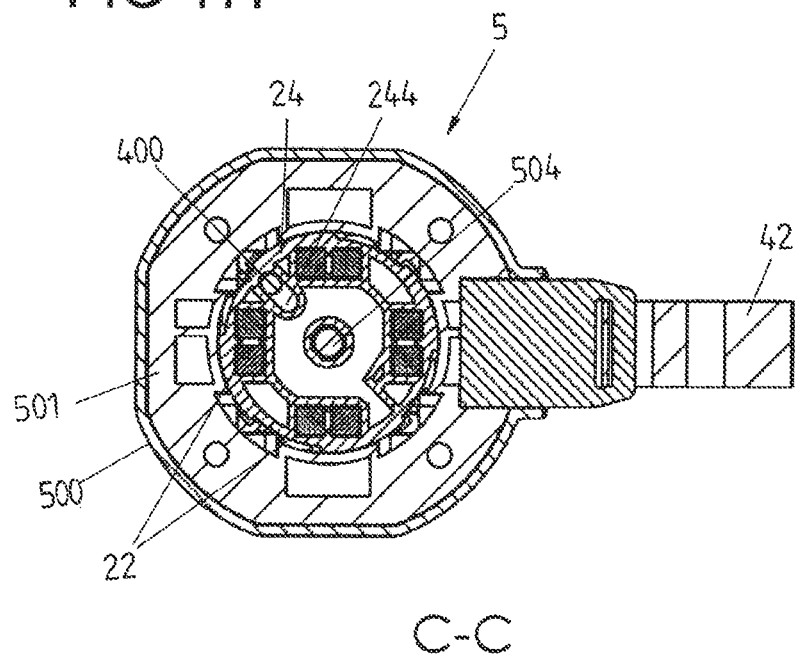
FIG. 17F shows a sectional view along the line C-C according to FIG. 17C.
Figure 17G:
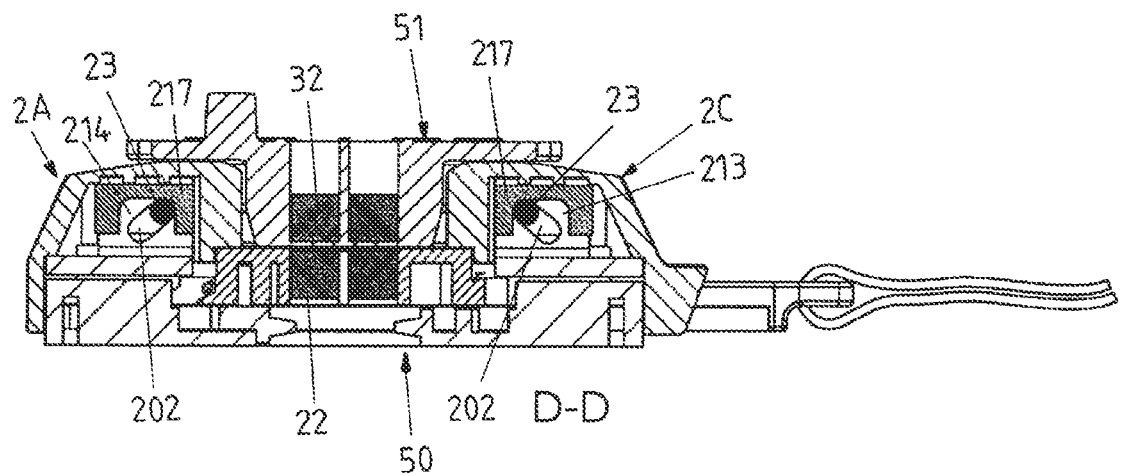
FIG. 17G shows a sectional view along the line D-D according to FIG. 17B.

The sliding elements 217 in the closing position are raised in the direction of the fastening unit 51 in relation to the operative element 24, as can be seen from FIG. 17E. The sliding elements 217 are not loaded by way of the operative element 24, the latter being situated in a non-activated rotary position.

In order for the closure assembly 5 to be opened, the activation element 4 by way of the handle 42 is activated in the unlocking direction E. The operative element 24 is rotated about the rotation axis D by virtue of the activation element 4 been coupled to the operative element 24 by way of the coupling element 400, as can be seen in particular from FIG. 18F.

Figure 18D:
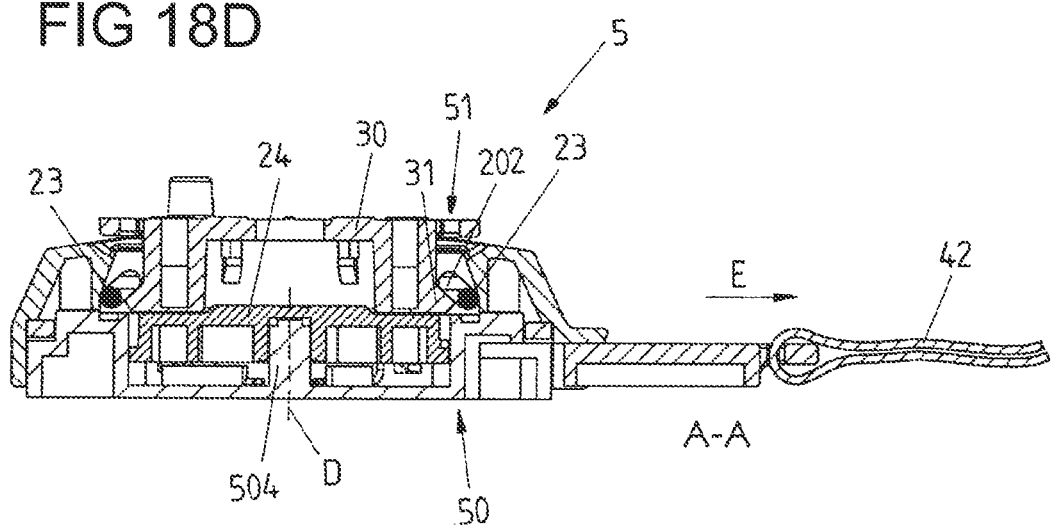
FIG. 18D shows a sectional view along the line A-A according to FIG. 18B.
Figure 18E:
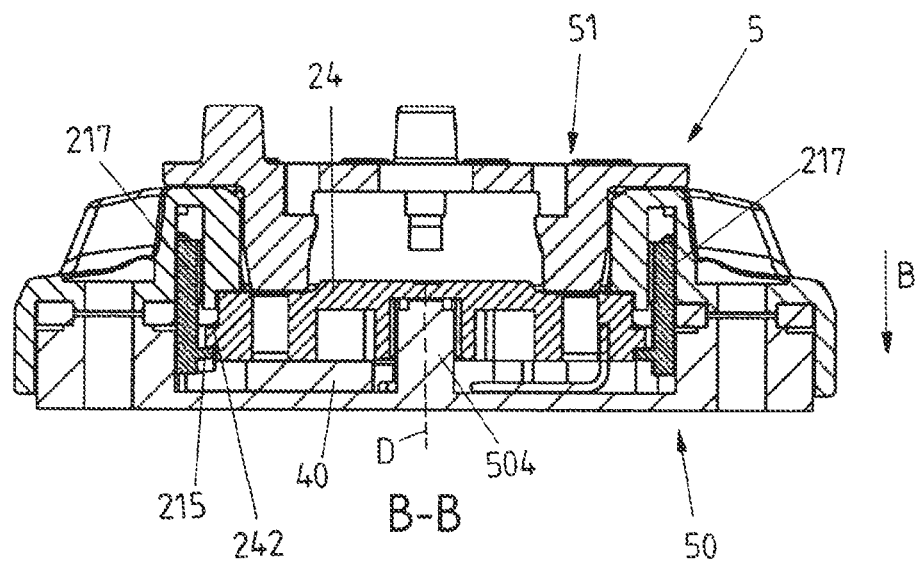
FIG. 18E shows a sectional view along the line B-B according to FIG. 18B.
Figure 18F:
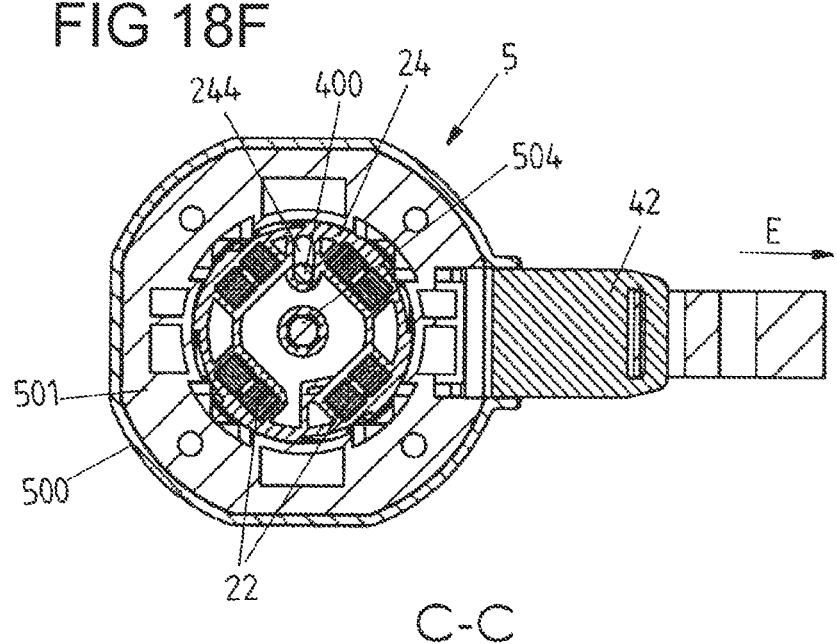
FIG. 18F shows a sectional view along the line C-C according to FIG. 18C.

On account thereof, the operative element 24 acts on the sliding elements 217 in that guiding installations 242 of the operative element 24 act on guide pins 215 on the sliding elements 217 and, on account thereof, draw the sliding elements 217 downwards in an activation direction B, as can be seen from FIG. 18D. On account thereof, the locking elements 23 in the assigned receptacle openings 202 of the locking assembly 25 are adjusted downwards and towards the outside, this being caused by the sliding elements 217 being coupled to the locking elements 23 by way of the bearing openings 213, 214, as can be seen from FIGS. 18D and 18G.

Figure 18G:
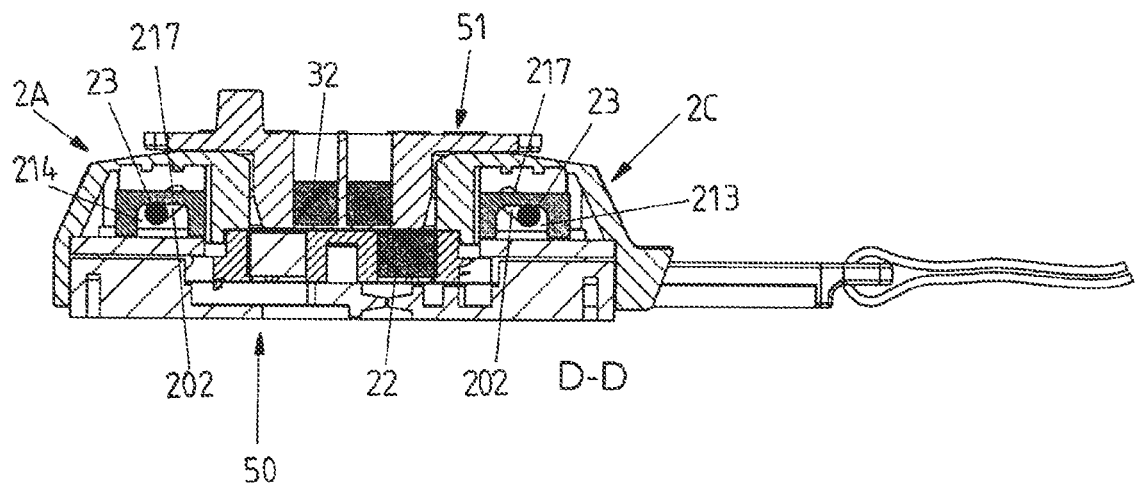
FIG. 18G shows a sectional view along the line D-D according to FIG. 18B.
Figure 19A:
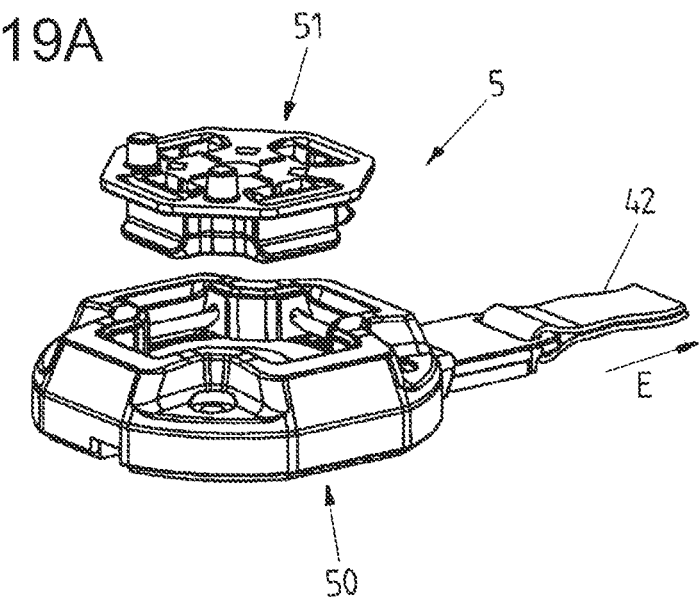
FIG. 19A shows a view of the closure assembly when being further opened.
Figure 19B:
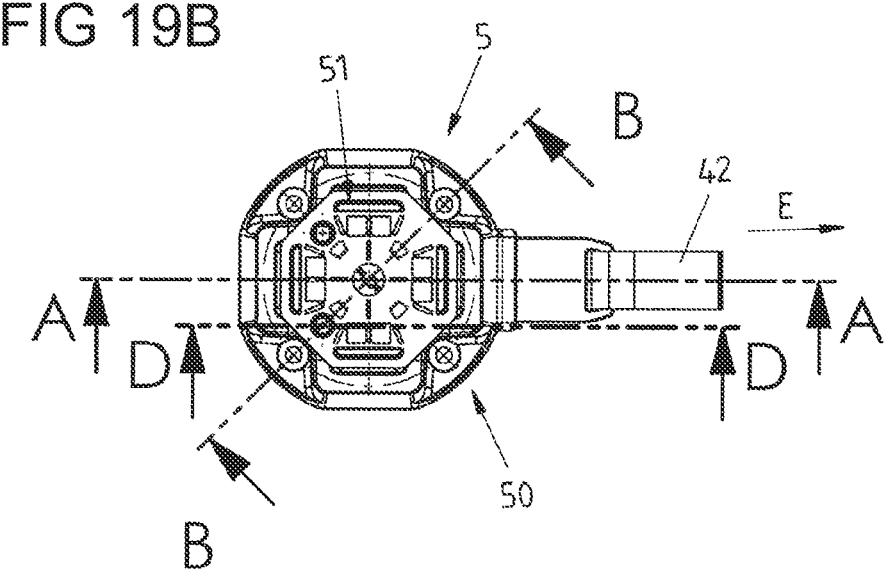
FIG. 19B shows a plan view of the closure assembly.
Figure 19C:
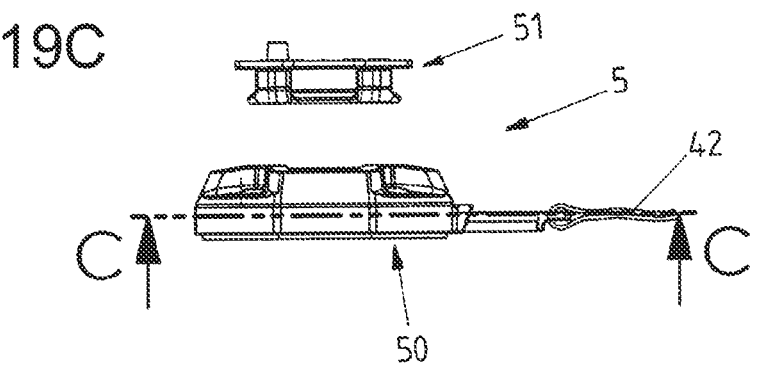
FIG. 19C shows a lateral view of the closure assembly.
Figure 19D:
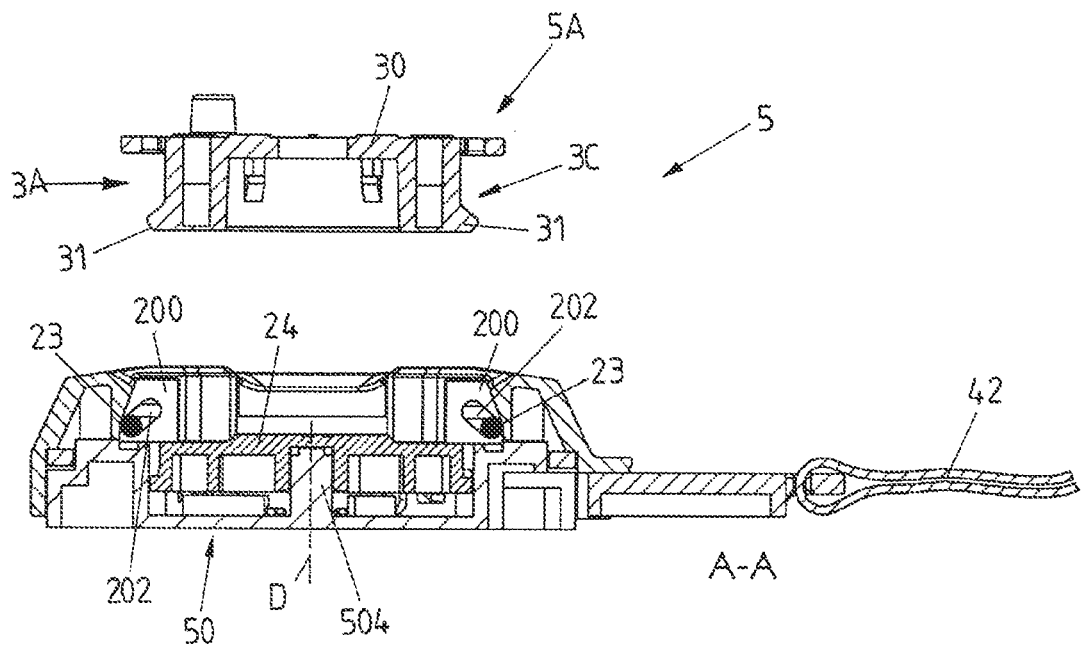
FIG. 19D shows a sectional view along the line A-A according to FIG. 19B.
Figure 19E:
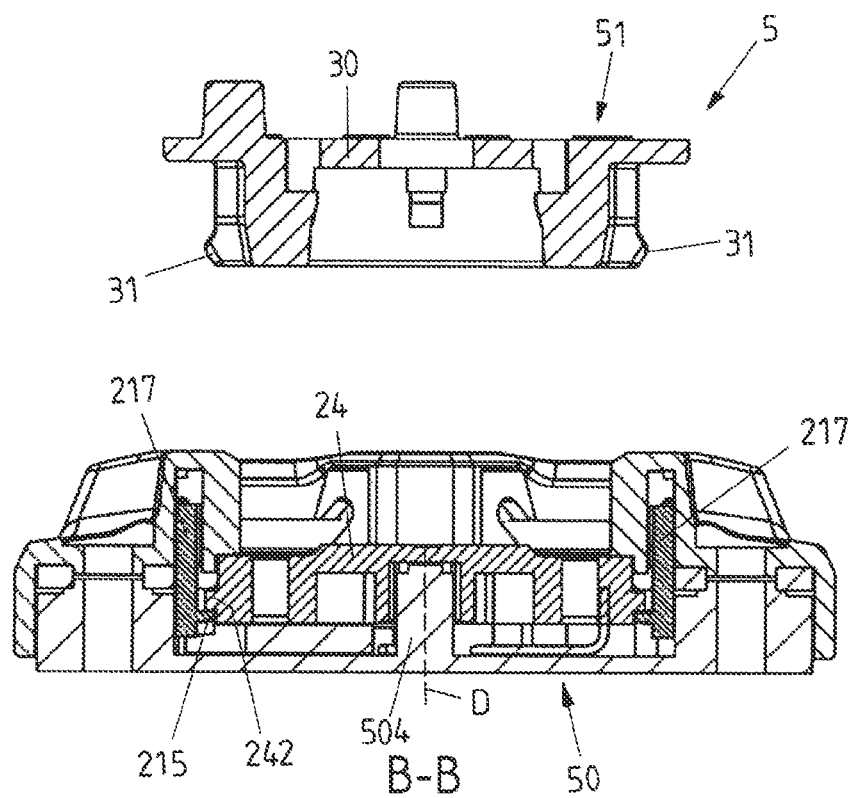
FIG. 19E shows a sectional view along the line B-B according to FIG. 19B.
Figure 19F:
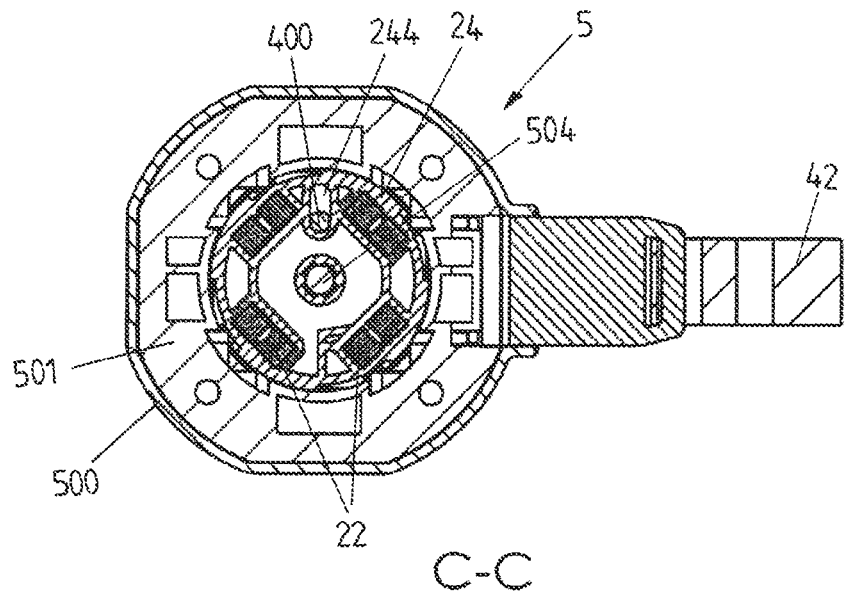
FIG. 19F shows a sectional view along the line C-C according to FIG. 19C.
Figure 19G:
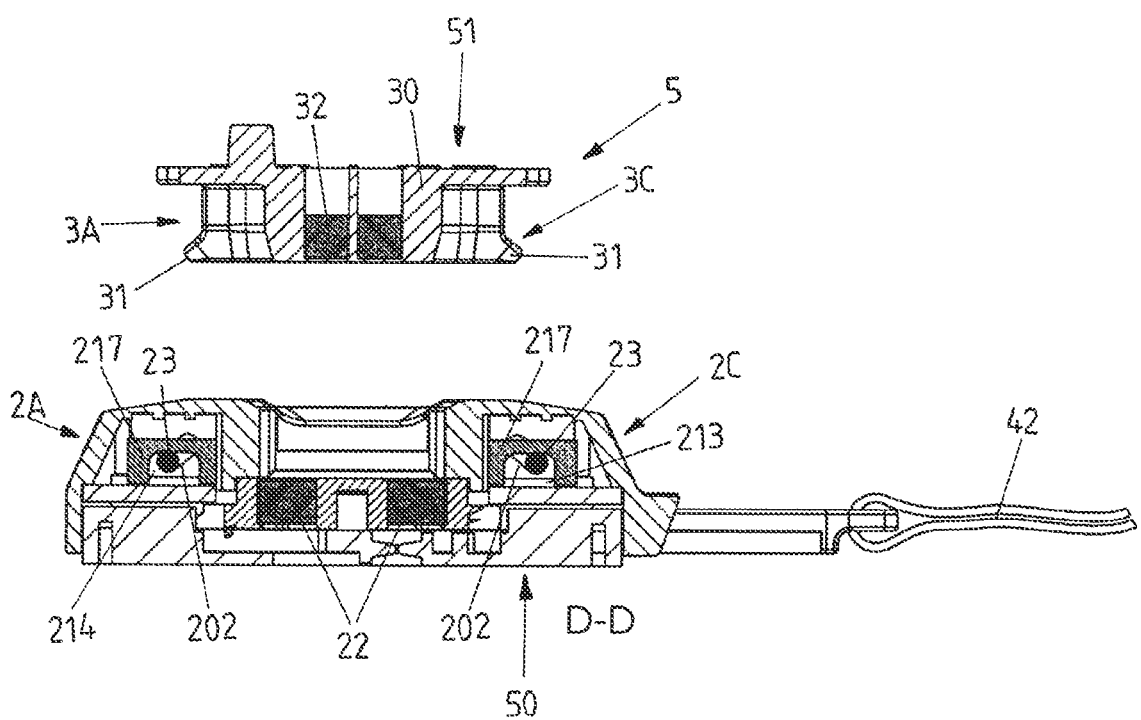
FIG. 19G shows a sectional view along the line D-D according to FIG. 19B.
Figure 20A:
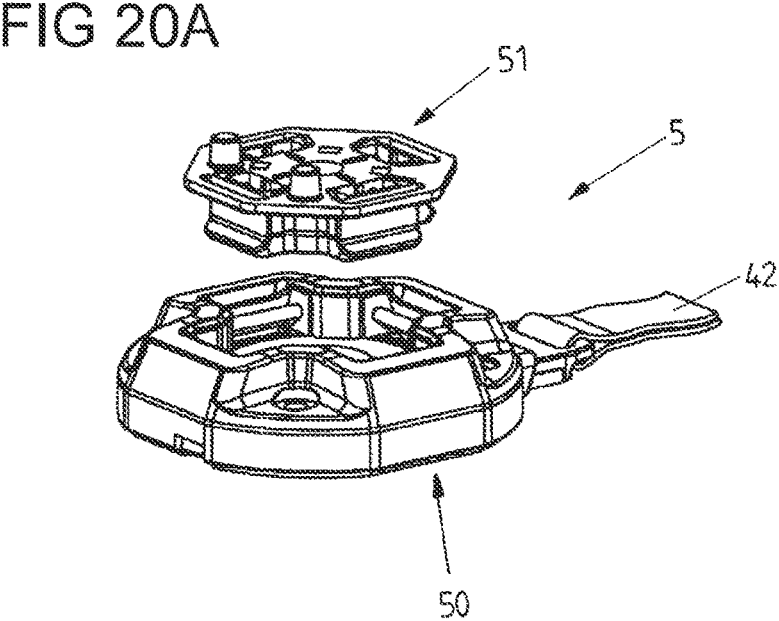
FIG. 20A shows a view of the closure assembly in an opened position.
Figure 20B:
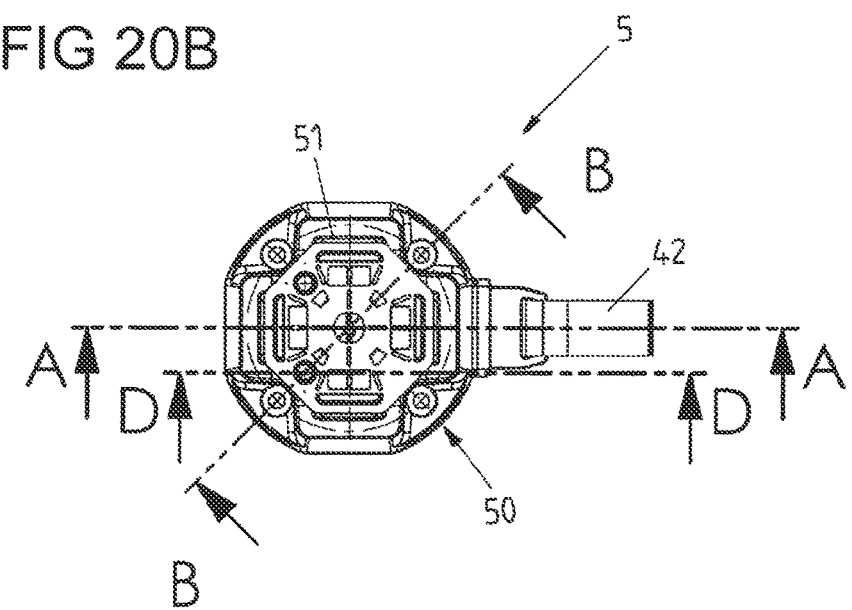
FIG. 20B shows a plan view of the closure assembly.
Figure 20C:
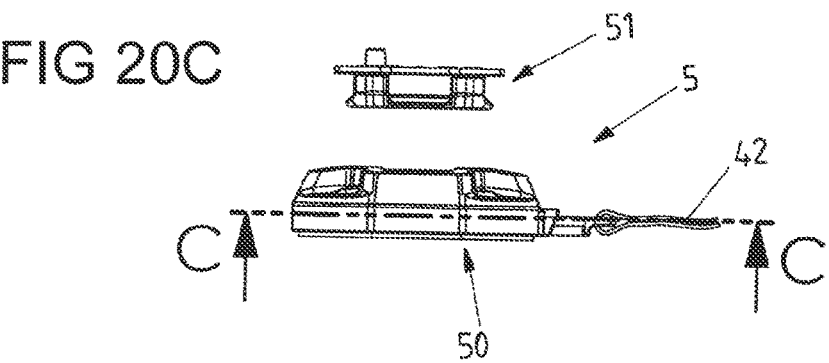
FIG. 20C shows a lateral view of the closure assembly.
Figure 20D:
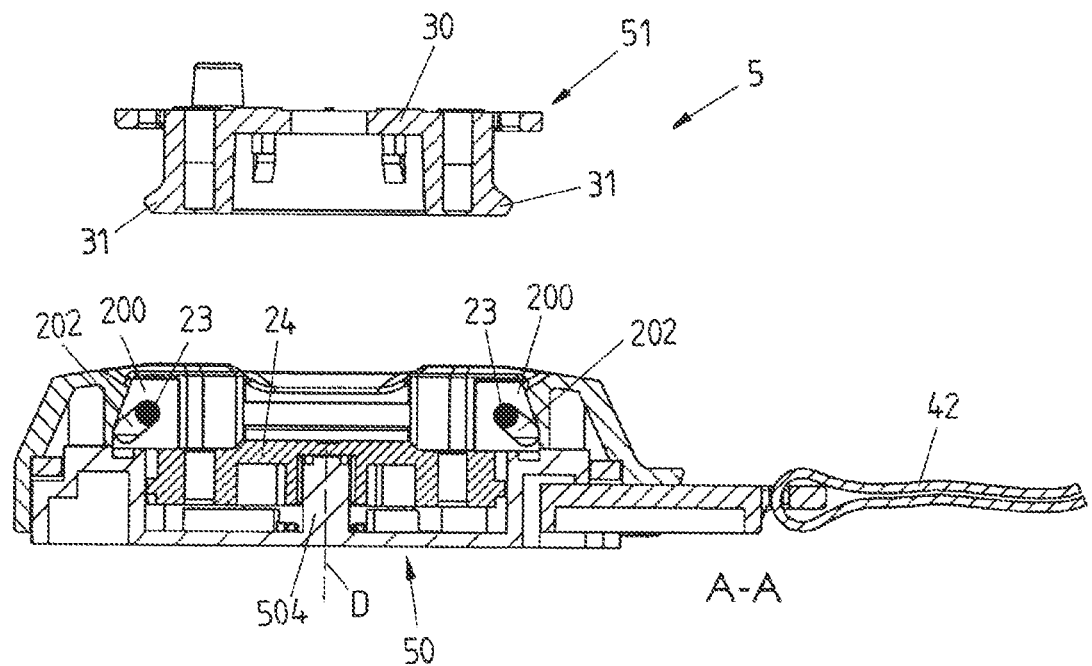
FIG. 20D shows a sectional view along the line A-A according to FIG. 20B.
Figure 20E:
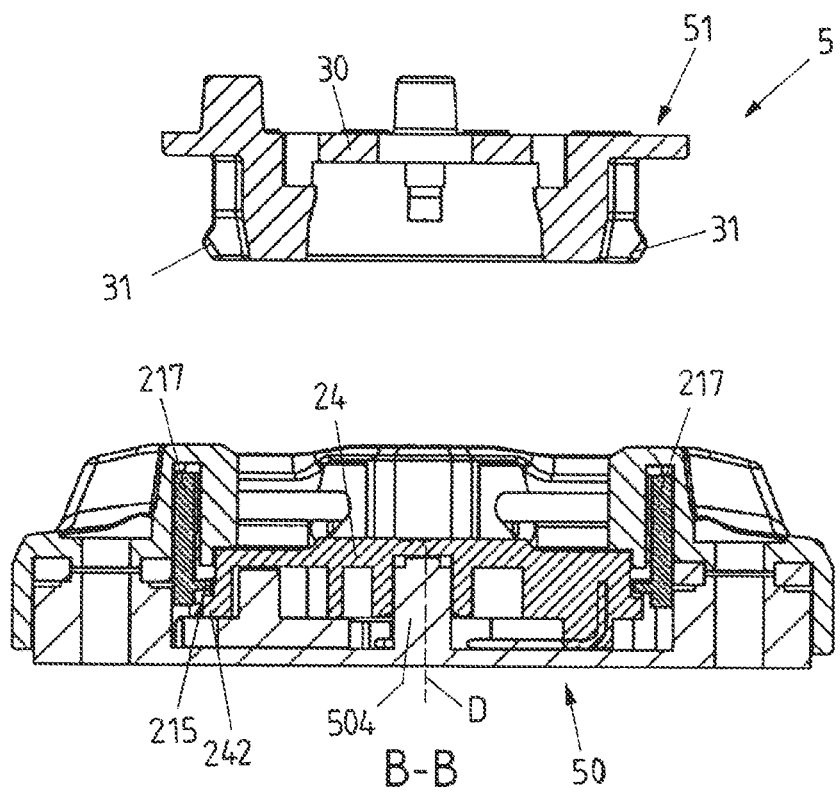
FIG. 20E shows a sectional view along the line B-B according to FIG. 20B.
Figure 20F:
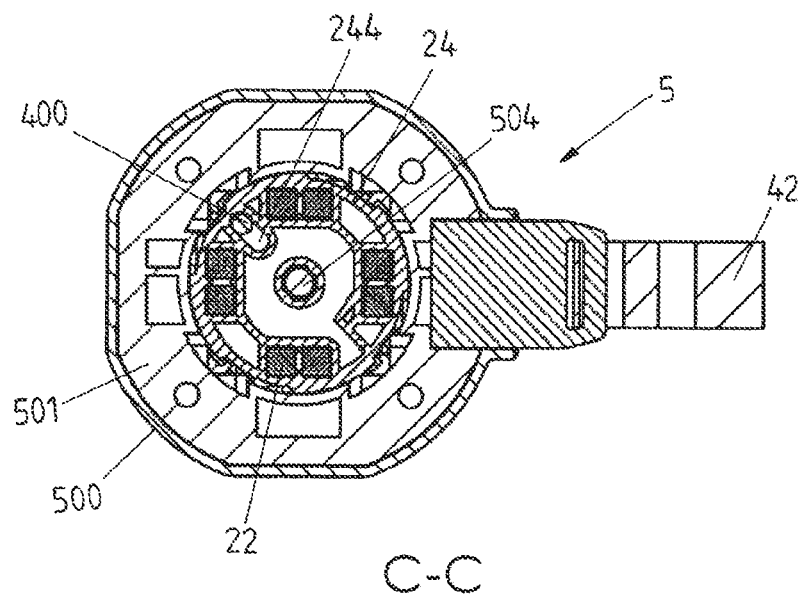
FIG. 20F shows a sectional view along the line C-C according to FIG. 20C.
Figure 20G:
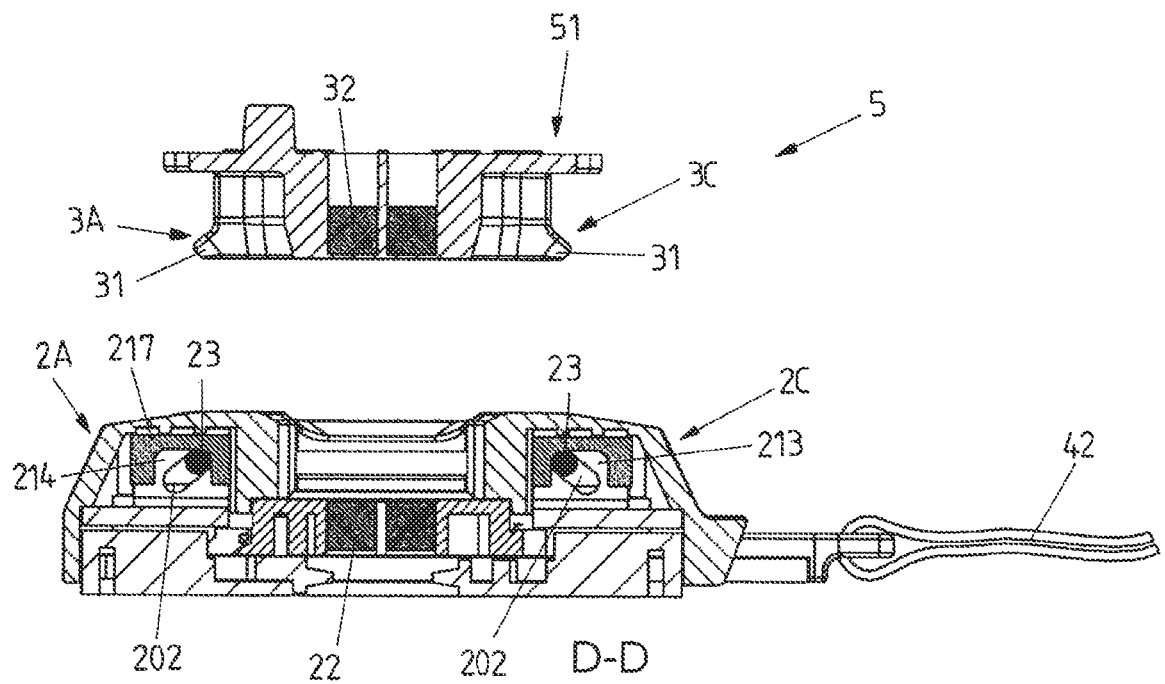
FIG. 20G shows a sectional view along the line D-D according to FIG. 20B.

In the activation of the operative element 24 the magnetic elements 22 are moreover rotated conjointly with the operative element 24 so that the magnetic elements 22 are moved out of the position of the latter opposite the magnetic elements 32, as can be seen from FIG. 18G. A magnetic attraction between the fastening units 50, 51 is thus reduced or cancelled or even reversed so as to be repulsive.

The fastening units 50, 51, upon being unlocked by way of the activation element 4, can thus be removed from one another, as is illustrated in FIGS. 19A to 19G.

After the opening of the closure assembly and after releasing the handle 42, the activation element 4 returns to the non-activated position thereof, illustrated in FIGS. 20A to 20G, wherein this resetting of the activation element 4 takes place in a self-acting manner, for example by a bias of a spring element 43 (cf. FIG. 14).

The closure assembly 5 is thus situated in an opened position. The closure assembly 5 can be re-closed by placing the fastening units 50, 51 against one another again.

FIGS. 21A-21C and FIGS. 22A-22C show dedicated views of the locking assembly 25 having the closure parts 2A-2D disposed thereon and the operative element 24.

A guide pin 215 which points towards the inside and which serves for interacting with the guiding installations 242 of the operative element 24 is shaped on each sliding element 217, said sliding elements 217 conjointly configuring the adjustment parts 21 of the closure parts 2A-2D. Each sliding element 217 herein is assigned a guiding installation 242 on the external circumference of the operative element 24 so that the sliding elements 217 can be conjointly rotated by rotating the operative element 24 about the rotation axis D.

Figure 21A:
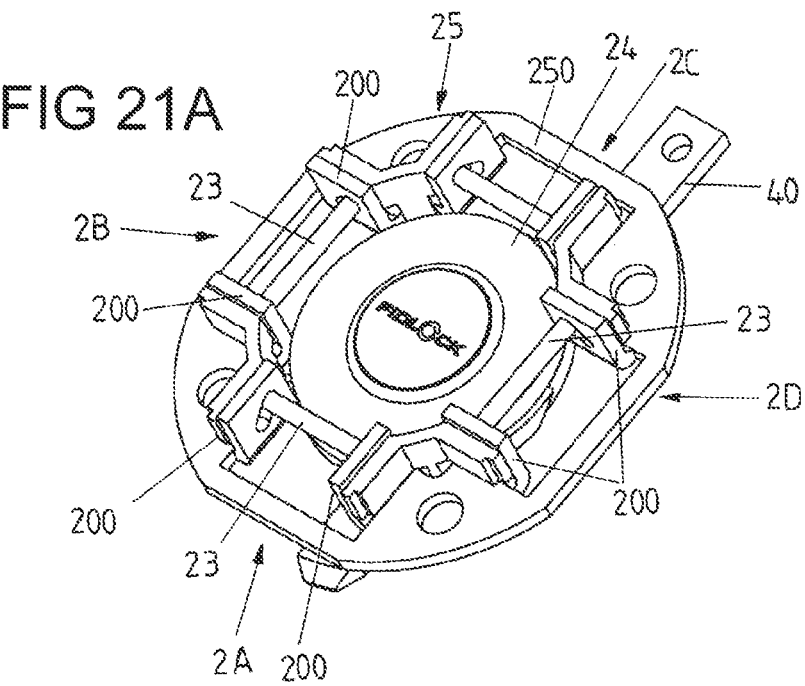
FIG. 21A shows a dedicated view of a locking assembly of a fastening unit of the closure assembly in a locked position when viewed from above.
Figure 21B:
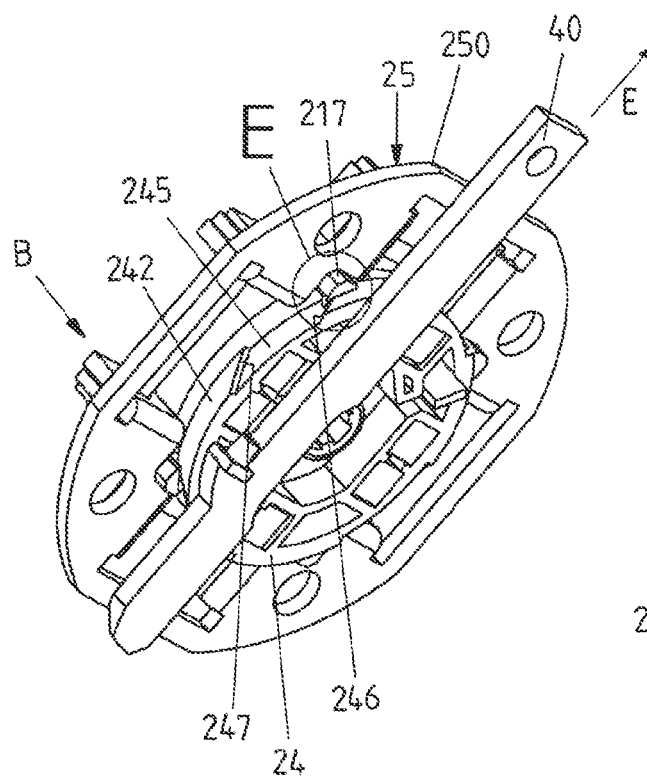
FIG. 21B shows a view of the locking assembly of a fastening unit of the closure assembly in the locked position when viewed from below.
Figure 21C:
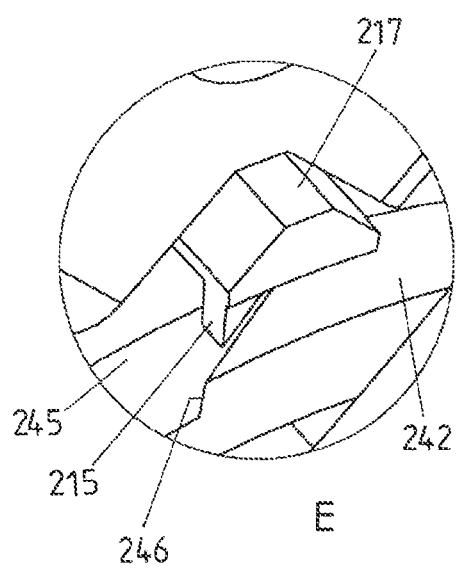
FIG. 21C shows a view of an enlarged detail in the fragment E according to FIG. 21B.
Figure 22A:
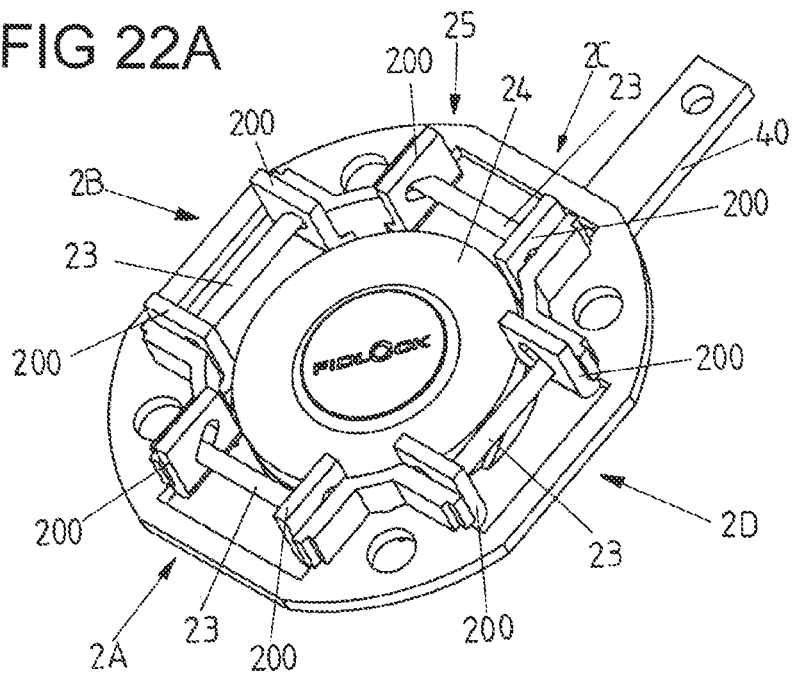
FIG. 22A shows a view of the locking assembly of the fastening unit of the closure assembly in an unlocked position when viewed from above.
Figure 22B:
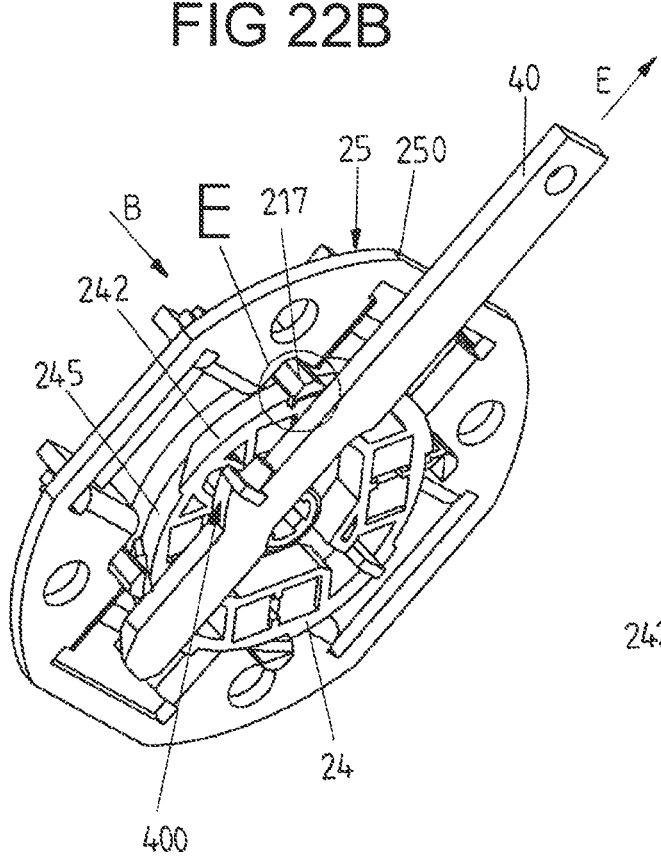
FIG. 22B shows a view of the locking assembly of the fastening unit of the closure assembly in the locked position when viewed from below.
Figure 22C:
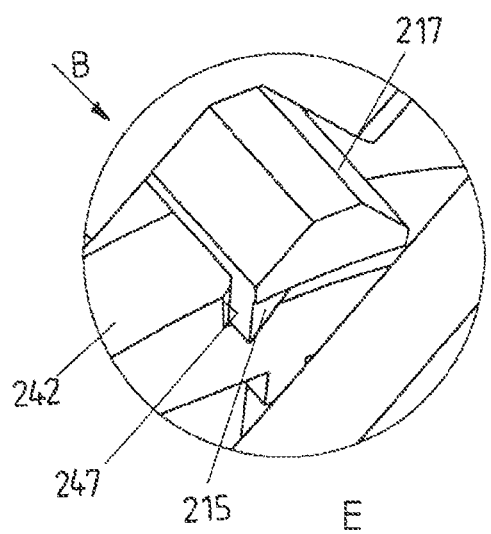
FIG. 22C shows an enlarged view in the fragment E according to FIG. 22B.

As can be seen from FIGS. 21B and 21C as well as FIGS. 22B and 22C, the guiding installations 242 of the operative element 24 in the exemplary embodiment illustrated are shaped by ramps 246, 247 which delimit a circumferential recess 245 of the operative element 24. Each sliding element 217 by way of the guide pins 215 lies in an assigned recess 245 of the operative element 24.

The sliding elements 217 in the closing position, corresponding to the views according to FIGS. 21A to 21C, are raised counter to the activation direction B in relation to the disk-shaped body 250. The locking elements 23 are situated in a raised position which is offset towards the inside, as can be seen from FIG. 21A. The guide pins 215 in this position bear on a respective assigned first ramp 246, as can be seen from FIGS. 21B and 21C.

The sliding elements 217 herein are held in the raised position by the ramps 246. Additionally or alternatively, the sliding elements 217 are moved to the raised position and held in the latter conjointly with the locking elements 23. The locking elements 23 herein move to the upper locking position, which is offset towards the inside, by virtue of a magnetic interaction with the magnetic elements 22 on the operative element 24.

When the operative element 24 is rotated for activating the sliding elements 217, as can be seen from FIGS. 22A to 22C, the guide pins 215 of the sliding elements 217 thus come to bear on the respective assigned ramp 247 on the other side of the assigned recess 245 and run onto said ramp 247. On account thereof, the sliding elements 217 are conjointly displaced in the activation direction B and are thus adjusted such that the locking elements 23 in the assigned receptacle openings of the support elements 200 are offset downwards and towards the outside, as can be seen from FIG. 22A. The locking elements 23 in this manner are brought to disengage from the assigned engagement elements 31 of the closure parts 3A-3D of the fastening unit 51, as has been explained above.

While dedicated operative elements 24 for each closure part 2A-2D are provided in the exemplary embodiment according to FIGS. 1 to 13, a common operative element 24 for conjointly unlocking all of the locking elements 23 of the closure parts 2A-2D is provided in the exemplary embodiment according to FIGS. 14 to 22A-22C. In functional terms, in particular with a view to the locking action by way of the locking elements 23 in interaction with the engagement elements 31, the exemplary embodiments are otherwise substantially identical such that reference is also made to the description pertaining to the exemplary embodiment according to FIGS. 1 to 13 with a view to the functionality of the exemplary embodiment according to FIGS. 14 to 22A-22C.

The concept on which the solution is based is not limited to the exemplary embodiments outlined above but can also be implemented in other ways.

A closure device of the type described can be used in very different ways.

A closure assembly can thus be used for connecting an assembly, for example a bag, to a superordinate assembly, for example a vehicle. For example, a bag can be fastened to a tank of a motorcycle by way of a closure assembly.

A closure device of the type described can moreover be used for connecting an electronic apparatus to a superordinate assembly, for example in or on a vehicle, for example a motor vehicle or a bicycle. For example, a mobile phone can be (releasably) established on a dashboard of a motor vehicle or on a handlebar of a bicycle by way of such a device.

The closure device can however also be used for connecting other objects to one another, for example as a closure fora helmet, in particular a sports helmet, fora bag, or for an item of clothing.

LIST OF REFERENCE SIGNS 1, 1A-D Closure device
2, 2A-D Closure part
20 Body
200 Support element
201 Oblique face
202 Receptacle opening
21 Adjustment part
210 Body element
211, 212 Bearing arm
213, 214 Bearing opening
215, 216 Guide element (guide pin)
217 Sliding element
22 Magnetic installation
23 Locking element
24 Operative element
240 Rotary body
241 Assembly opening
242 Guiding installation
243 Toothing
244 Coupling opening
245 Recess
246, 247 Ramp
25 Locking assembly
250 Body
3, 3A-D Closure part
30 Base unit
31 Engagement element
310 Engagement portion
311 Oblique face
32 Magnetic installation
33 Fastening plate
4 Activation element
40 Adjustment body
400 Coupling element (coupling pin)
41, 41A-D Toothed portion
42 Handle
43 Spring element
5 Closure assembly
50 Fastening unit
500 Housing part
501 Cover
502A-D Bearing receptacle
503 Base
504 Bearing element (bearing pin)
51 Fastening unit
A Rotation direction
B Activation direction
C Activation direction
D Rotation axis
E Unlocking direction
X Closing direction

The invention claimed is:

1. A closure device comprising
a first closure part which has a body, and a second closure part, said first closure part and said second closure part for closing the closure device being able to be placed against one another along a closing direction and in a closing position being connected to one another; and
at least one locking element which is adjustable in relation to the body of the first closure part; and
at least one engagement portion which is shaped on the second closure part, wherein the at least one locking element and the at least one engagement portion in a closing position are mutually engaged in such a manner that the first closure part and the second closure part are locked to one another,
wherein the first closure part has a first magnetic installation, and the second closure part has a second magnetic installation, wherein the first magnetic installation and the second magnetic installation when placing the first closure part and the second closure part against one another interact in a magnetically attractive manner, and the at least one locking element is magnetically configured in such a manner that the at least one locking element in the closing position by way of the first magnetic installation and/or the second magnetic installation is loaded in a direction of engaging with the at least one engagement portion, wherein the first closure part has an adjustment part and an operative element which is operatively connected to the adjustment part and is rotatable about a rotation axis, wherein the adjustment part by rotating the operative element is activatable in an activation direction so as to bring the at least one locking element to disengage from the at least one engagement portion in order for the first closure part and the second closure part to be released from one another, and wherein the activation direction is directed along the rotation axis.

2. The closure device according to claim 1, wherein the rotation axis is directed along the closing direction.

3. The closure device according to claim 1, wherein the at least one locking element is disposed on the adjustment part.

4. The closure device according to claim 1, wherein the engagement portion has a first oblique face which extends obliquely to the closing direction, and the first closure part has a second oblique face which extends obliquely to the closing direction, wherein the at least one locking element in the closing position is disposed between the first oblique face and the second oblique face.

5. The closure device according to claim 4, wherein the first oblique face and the second oblique face in a plane which is spanned by the closing direction and a transverse direction are disposed parallel or at an angle which is greater than zero or less than zero.

6. The closure device according to claim 1, wherein the at least one locking element is configured as an elongate bar element.

7. The closure device according to claim 1, wherein the first magnetic installation is disposed on the operative element and is rotatable conjointly with the operative element.

8. The closure device according to claim 1, wherein, when rotating the operative element from a rotary position assigned to the closing position, a magnetic pull between the first magnetic installation and the second magnetic installation is weakened.

9. The closure device according to claim 1, wherein the second closure part has a base unit on which the at least one engagement portion is disposed.

10. A closure assembly having a plurality of closure devices according to claim 1.

11. The closure assembly according to claim 10, wherein the closure devices have a common operative element which is rotatable about a rotation axis.

12. The closure assembly according to claim 10, wherein the closure assembly has a first fastening unit and a second fastening unit, wherein the first fastening unit has a plurality of first closure parts of the plurality of closure devices, and the second fastening unit has a plurality of second closure parts of the plurality of closure devices.

13. The closure assembly according to claim 12, wherein the first fastening unit has an activation element which by way of a transmission connection is connected to the operative element of the first closure part of each closure device in such a manner that the operative element of each of the first closure parts is adjustable by activating the activation element.

14. The closure assembly according to claim 13, wherein the transmission connection is established by way of a toothing or a coupling element on the activation element.

15. A closure device comprising
a first closure part which has a body, and a second closure part, said first closure part and said second closure part for closing the closure device being able to be placed against one another along a closing direction and in a closing position being connected to one another; and
at least one locking element which is adjustable in relation to the body of the first closure part; and
at least one engagement portion which is shaped on the second closure part, wherein the at least one locking element and the at least one engagement portion in a closing position are mutually engaged in such a manner that the first closure part and the second closure part are locked to one another,
wherein the first closure part has a first magnetic installation, and the second closure part has a second magnetic installation, wherein the first magnetic installation and the second magnetic installation when placing the first closure part and the second closure part against one another interact in a magnetically attractive manner, and the at least one locking element is magnetically configured in such a manner that the at least one locking element in the closing position by way of the first magnetic installation and/or the second magnetic installation is loaded in a direction of engaging with the at least one engagement portion, wherein the first closure part has an adjustment part and an operative element which is operatively connected to the adjustment part and is rotatable about a rotation axis, wherein the adjustment part by rotating the operative element is activatable in an activation direction so as to bring the at least one locking element to disengage from the at least one engagement portion in order for the first closure part and the second closure part to be released from one another, and
wherein the operative element has a guiding installation on which the adjustment part is guided in such a manner that the adjustment part when rotating the operative element is activated in the activation direction.

16. The closure device according to claim 15, wherein the guiding installation is configured by a gate guide or at least one ramp.

17. A closure device comprising
a first closure part which has a body, and a second closure part, said first closure part and said second closure part for closing the closure device being able to be placed against one another along a closing direction and in a closing position being connected to one another; and
at least one locking element which is adjustable in relation to the body of the first closure part; and
at least one engagement portion which is shaped on the second closure part, wherein the at least one locking element and the at least one engagement portion in a closing position are mutually engaged in such a manner that the first closure part and the second closure part are locked to one another,
wherein the first closure part has a first magnetic installation, and the second closure part has a second magnetic installation, wherein the first magnetic installation and the second magnetic installation when placing the first closure part and the second closure part against one another interact in a magnetically attractive manner, and the at least one locking element is magnetically configured in such a manner that the at least one locking element in the closing position by way of the first magnetic installation and/or the second magnetic installation is loaded in a direction of engaging with the at least one engagement portion, wherein the first closure part has an adjustment part and an operative element which is operatively connected to the adjustment part and is rotatable about a rotation axis, wherein the adjustment part by rotating the operative element is activatable in an activation direction so as to bring the at least one locking element to disengage from the at least one engagement portion in order for the first closure part and the second closure part to be released from one another, and wherein the at least one locking element is received so as to be adjustable in a receptacle opening of the first closure part.

18. A closure assembly having a plurality of closure devices which comprise in each case:
  a first closure part which has a body, and a second closure part, said first closure part and said second closure part for closing the closure device being able to be placed against one another along a closing direction and in a closing position being connected to one another; and
  at least one locking element which is adjustable in relation to the body of the first closure part; and
  at least one engagement portion which is shaped on the second closure part, wherein the at least one locking element and the at least one engagement portion in a closing position are mutually engaged in such a manner that the first closure part and the second closure part are locked to one another,
  wherein the first closure part of each closure device has a first magnetic installation, and the second closure part of each closure device has a second magnetic installation, wherein the first magnetic installation and the second magnetic installation when placing the first closure part and the second closure part against one another interact in a magnetically attractive manner, and the at least one locking element is magnetically configured in such a manner that the at least one locking element in the closing position by way of the first magnetic installation and/or the second magnetic installation is loaded in a direction of engaging with the at least one engagement portion, wherein the first closure part of each closure device has an adjustment part and an operative element which is operatively connected to the adjustment part, wherein the adjustment part by adjusting the operative element is activatable in an activation direction so as to bring the at least one locking element to disengage from the at least one engagement portion in order for the first closure part and the second closure part to be released from one another, wherein the closure assembly has an activation element which by way of a transmission connection is connected to the operative elements of the first closure parts of the plurality of closure devices in such a manner that the operative elements are conjointly adjustable by activating the activation element.

19. The closure assembly according to claim 18, wherein the operative elements of the first closure parts of the closure devices is configured by a common element which is rotatable about a common rotation axis.

* * * * *